United States Patent
Taguchi et al.

(10) Patent No.: US 11,740,613 B2
(45) Date of Patent: Aug. 29, 2023

(54) MONITORING APPARATUS, MONITORING METHOD, COMPUTER PROGRAM PRODUCT, AND MODEL TRAINING APPARATUS

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yasunori Taguchi, Kawasaki Kanagawa (JP); Kouta Nakata, Kawasaki Kanagawa (JP); Susumu Naito, Kawasaki Kanagawa (JP); Yuichi Kato, Kawasaki Kanagawa (JP); Toshio Aoki, Yokohama Kanagawa (JP); Shinya Tominaga, Yokohama Kanagawa (JP); Isaku Nagura, Yokohama Kanagawa (JP); Ryota Miyake, Yokohama Kanagawa (JP); Chikashi Miyamoto, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 32 days.

(21) Appl. No.: 17/185,882

(22) Filed: Feb. 25, 2021

(65) Prior Publication Data

US 2021/0356943 A1 Nov. 18, 2021

(30) Foreign Application Priority Data

May 12, 2020 (JP) .................... 2020-084110

(51) Int. Cl.
*G05B 19/418* (2006.01)
*G06N 20/00* (2019.01)
*G06F 17/18* (2006.01)

(52) U.S. Cl.
CPC ......... *G05B 19/4183* (2013.01); *G06F 17/18* (2013.01); *G06N 20/00* (2019.01)

(58) Field of Classification Search
CPC ...... G05B 19/4183; G06N 20/00; G06F 17/18
See application file for complete search history.

(56) References Cited

U.S. PATENT DOCUMENTS

2016/0045170 A1*  2/2016  Migita ............... A61B 5/743
                                                                   434/247
2016/0196175 A1*  7/2016  Kasahara .......... G06F 11/076
                                                                   714/49

(Continued)

FOREIGN PATENT DOCUMENTS

EP            3 605 410 A1     2/2020
JP         2007-279887 A      10/2007

(Continued)

*Primary Examiner* — Raymond L Nimox
(74) *Attorney, Agent, or Firm* — Finnegan, Henderson, Farabow, Garrett & Dunner, LLP

(57) ABSTRACT

According to an embodiment, a monitoring apparatus configured to generate time-series predicted data based on time-series measured data and a prediction model that generates predicted data including one or more predicted values predicted to be output from one or more sensors; and generate, for a first sensor among the one or more sensors, a displayed image including a measured value graph representing a temporal change in a measured value included in the time-series measured data in a second period after a first period, a predicted value graph representing a temporal change in a predicted value included in time-series predicted data in the second period, past distribution information representing a distribution of a measured value in the first period, and measurement distribution information representing a distribution of the measured value included in the time-series measured data in the second period.

18 Claims, 24 Drawing Sheets

(56) References Cited

U.S. PATENT DOCUMENTS

| | | | |
|---|---|---|---|
| 2017/0286841 A1* | 10/2017 | Yoshinaga | G05B 23/024 |
| 2018/0245987 A1* | 8/2018 | Mizoguchi | G06F 17/15 |
| 2018/0314243 A1* | 11/2018 | Fujita | G05B 13/0265 |
| 2019/0026632 A1* | 1/2019 | Natsumeda | G06N 5/022 |
| 2019/0391573 A1* | 12/2019 | Wang | G05B 15/02 |
| 2020/0103894 A1 | 4/2020 | Cella et al. | |
| 2020/0293018 A1* | 9/2020 | Tsunoo | G06N 3/08 |
| 2021/0065023 A1 | 3/2021 | Naito et al. | |
| 2021/0089962 A1* | 3/2021 | Sato | G06N 20/00 |
| 2021/0264259 A1 | 8/2021 | Kato et al. | |
| 2021/0383250 A1* | 12/2021 | Uejima | G06N 20/00 |

FOREIGN PATENT DOCUMENTS

| | | |
|---|---|---|
| JP | 2021-33705 A | 3/2021 |
| JP | 2021-135683 A | 9/2021 |

* cited by examiner

MONITORING APPARATUS, MONITORING METHOD, COMPUTER PROGRAM PRODUCT, AND MODEL TRAINING APPARATUS

CROSS-REFERENCE TO RELATED APPLICATIONS

This application is based upon and claims the benefit of priority from Japanese Patent Application No. 2020-084110, filed on May 12, 2020; the entire contents of which are incorporated herein by reference.

FIELD

Embodiments described herein relate generally to a monitoring apparatus, a monitoring method, a computer program product, and a model training apparatus.

BACKGROUND

Systems such as a power generation plant, a water treatment plant, and a manufacturing apparatus each include a plurality of devices. When any of these systems is an infrastructure, system shutdown exerts a bad influence on social functions. Even when the system is not an infrastructure, system shutdown causes economic loss. For this reason, it is important to maintain such systems at a sound condition.

To prevent a breakdown of a system or to restore the system as soon as possible after a breakdown, the system is required to be monitored. Sensors are installed in various places of the system, and measured values output from the sensors installed in the various places are monitored, for example. Thus, the system can be monitored. However, when the scale of the system is large or when the system is complex, the number of sensors that are required to be installed increases, and it may be difficult for a limited number of people to simultaneously monitor all the measured values.

An apparatus assisting monitoring of a measured value and an apparatus automatically determining a system abnormality based on a measured value have been known. A monitoring apparatus is known, based on a prediction model using a sensor measured value when a system is in a sound condition as training data, detecting a deviation between the measured value and a predicted value, which is a state in which a difference between the sensor measured value and the predicted value predicting the measured value is out of a preset range, for example. Such a monitoring apparatus, when detecting the deviation between the measured value and the predicted value, determines that the system is abnormal and transmits a warning to a user terminal. When such a monitoring apparatus is used, when receiving the warning, a user may take measures for maintaining the system at a sound condition. Consequently, such a monitoring apparatus can reduce time and effort to monitor the system by the user.

Even when the measured value and the predicted value deviate from each other, the system is not necessarily in an unsound condition. For example, the measured value and the predicted value may deviate from each other due to switching of an operation mode to switch a redundant device in the system for maintenance. For another example, the measured value and the predicted value may deviate from each other due to repair or replacement of any device in the system. Thus, when receiving a warning from a conventional monitoring apparatus, the user must check whether system maintenance, device repair or replacement, a change of the operation mode of the system, or the like has been performed and, when it is determined that the system is in an unsound condition, take measures for maintaining the system at a sound condition.

Thus, to maintain the system at a sound condition, the user must determine whether the deviation between the measured value and the predicted value is caused by the maintenance or the like or is caused by the fact that the system is not in a sound condition (the fact that a device has broken down, for example). Consequently, it is desirable that the monitoring apparatus is able to provide information that is helpful to such determination by the user.

A monitoring apparatus has been known that, when the occurrence of continuous abnormalities is detected, determines that a prediction model is required to be relearned. Such a monitoring apparatus can reduce time and effort to determine a time at which the prediction model is relearned by the user. However, when the prediction model is relearned when the occurrence of continuous abnormalities is detected, if the measured value and the predicted value deviate from each other by a breakdown of any device, a measured value measured by the broken-down device is mixed into the training data. The prediction model trained using such training data cannot detect the breakdown of the device causing the deviation between the measured value and the predicted value. Consequently, the user, when performing relearning of the prediction model, must not incorporate the measured value measured by the device causing the deviation between the measured value and the predicted value into the training data.

DETAILED DESCRIPTION

According to an embodiment, a monitoring apparatus includes a hardware processor configured to: acquire time-series measured data including one or more measured values output from one or more sensors installed in a system to be monitored; acquire a prediction model that generates predicted data including one or more predicted values predicted to be output from the one or more sensors at an arbitrary time based on the measured data at or before the arbitrary time; acquire, as a past data, data including past distribution information representing a distribution of a measured value in a first period, with respect to time-series past data including one or more measured values output from the one or more sensors before the time-series measured data in a time direction; generate the time-series predicted data based on the time-series measured data and the prediction model; and generate, for a first sensor among the one or more sensors, a displayed image including a measured value graph representing a temporal change in a measured value included in the time-series measured data in a second period after the first period, a predicted value graph representing a temporal change in a predicted value included in the time-series predicted data in the second period, the past distribution information in the first period, and measurement distribution information representing a distribution of the measured value included in the time-series measured data in the second period.

The following describes embodiments with reference to the accompanying drawings. Components denoted by the same reference symbols in the embodiments have substantially the same configuration and operation. For the components having substantially the same configuration and operation, a duplicate description will be omitted as appropriate except differences.

First Embodiment

The following describes a monitoring apparatus 10 according to a first embodiment.

The monitoring apparatus 10 according to the first embodiment monitors measured data output from one or more sensors installed in a system such as a power generation plant, a water treatment plant, or a manufacturing apparatus. The monitoring apparatus 10, when a state in which the measured data and predicted data predicted using a prediction model diverge from each other by a certain range or more occurs, presents information to determine whether the deviation is caused by maintenance or the like or is caused by the fact that the system is not in a sound condition to a user, for example.

The system to be monitored is not limited to the power generation plant, the water treatment plant, the manufacturing apparatus, and the like and may be any plant, apparatus, or equipment so long as the one or more sensors can be installed therein. Each of the one or more sensors may be any measurement device. The one or more sensors may include multiple kinds of measurement devices.

Figure 1:
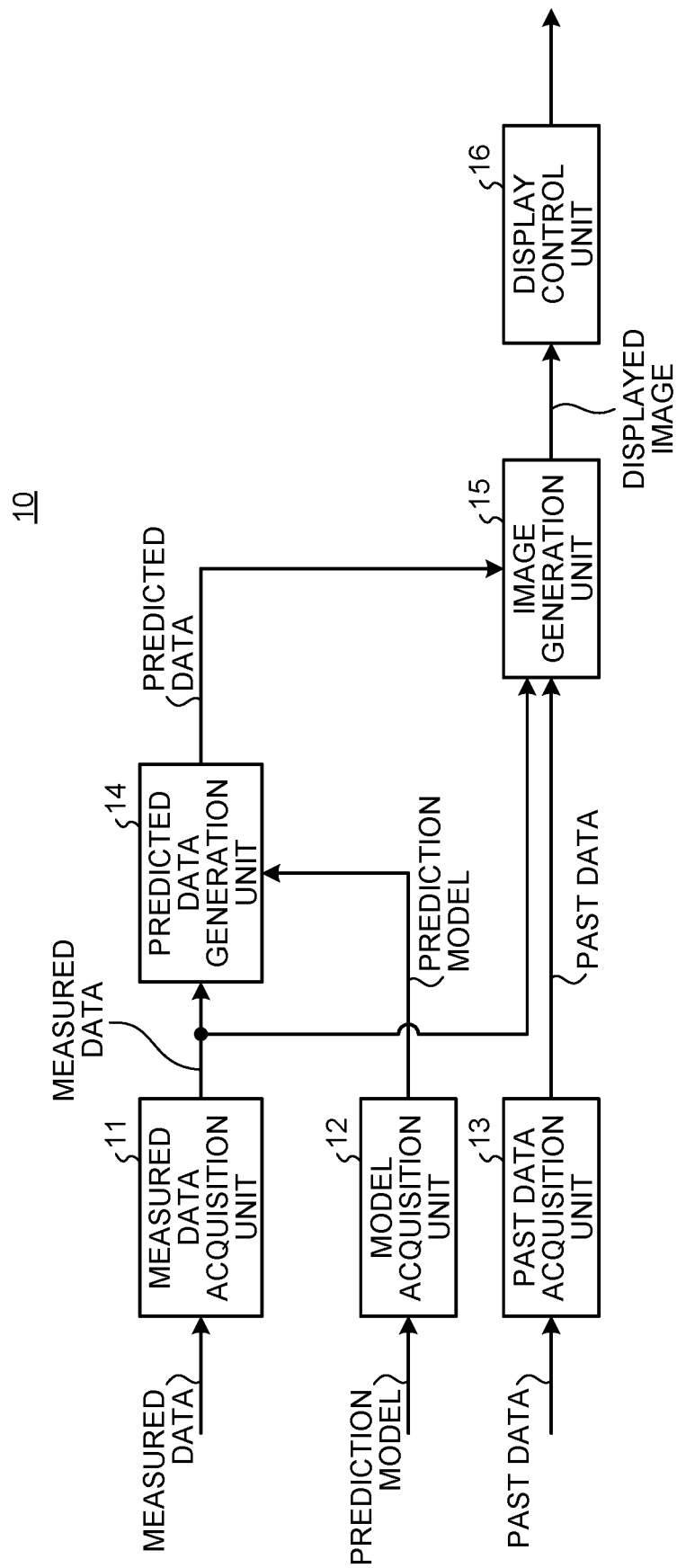
FIG. 1 is a diagram of a configuration of a monitoring apparatus according to a first embodiment.

FIG. 1 is a diagram of an exemplary configuration of the monitoring apparatus 10 according to the present embodiment. The monitoring apparatus 10 has a measured data acquisition unit 11, a model acquisition unit 12, a past data acquisition unit 13, a predicted data generation unit 14, an image generation unit 15, and a display control unit 16.

The measured data acquisition unit 11 acquires time-series measured data including one or more measured values output from the one or more sensors installed in the system to be monitored. The measured data acquisition unit 11 successively acquires the measured data for each prescribed time in real time during operation of the system, for example. The time-series measured data is a stream of measured data, in which each piece of measured data included is associated with a time. The measured data includes the one or more measured values output from the one or more sensors at a corresponding time. The measured data is vector data, for example. In this case, a plurality of elements included in the measured data correspond to a plurality of sensors installed in the system. Each of the elements included in the measured data is a measured value output from a corresponding sensor.

The model acquisition unit 12 acquires a prediction model from an external apparatus prior to monitoring of the system. The model acquisition unit 12, when the prediction model is updated, acquires the prediction model after being updated.

The prediction model, based on the measured data at or before an arbitrary first time, generates predicted data including one or more predicted values predicted to be output from the one or more sensors at the first time. The prediction model may predict the predicted data at the first time from the measured data at the first time, for example. The prediction model may predict the predicted data at the first time from the measured data at one or more times before the first time. The prediction model may predict the predicted data at the first time from the measured data at the first time and the measured data at the one or more times before the first time.

The predicted data is described in the same format as that of the measured data. When the measured data is vector data, for example, the predicted data is also vector data. In this case, each of a plurality of elements included in the predicted data corresponds to any sensor among a plurality of sensors installed in the system and is a predicted value predicted to be output from the corresponding sensor.

The prediction model is trained based on the measured data including one or more measured values output by the one or more sensors in the past. The prediction model is trained based on the measured data in a past period in which the system to be monitored is in a sound condition, for example.

The prediction model is an autoencoder model, for example. The prediction model as the autoencoder model is trained using a correlation among a plurality of sensors.

The measured data is represented as a vector x, for example. The prediction model is represented as a function $f$. In this case, the external apparatus acquires a function minimizing Expression (1) as f out of a function g, which, when x is input, outputs a vector of the same dimension, by training using training data X.

$$\sum_{x \in X} \| g(x) - x \|^2 \quad (1)$$

The training data X in Expression (1) is a group of measured data in a past period in which the system to be monitored is in a sound condition, for example. The external apparatus gives the prediction model f to the monitoring apparatus 10.

The prediction model may be a model of another system, not the autoencoder. The prediction model may be a model using any machine learning system. The prediction model may be a neural network model outputting the predicted data at the current time when the measured data of a prescribed number of times is input, for example. The prediction model may be a linear regression model, for each of the one or more sensors, outputting the predicted value of the sensor when the measured value of another sensor is input. The prediction model may be the same as the linear regression model in input/output and may be another system such as a neural network, a deep neural network, a decision tree, or a random forest as a regression system. The prediction model may be the linear regression model outputting the predicted data at the current time when the measured data of a prescribed number of times is input, for example. Also in this case, the regression system may be any system. The prediction model is often trained using a correlation between a plurality of sensors or in a time direction.

The past data acquisition unit 13 acquires time-series past data including one or more measured values output from the one or more sensors. The time-series past data is data output before in the time direction than the time-series measured data acquired by the measured data acquisition unit 11. The past data acquisition unit 13 reads the time-series past data from a memory having stored therein the past measured data, for example. The past data acquisition unit 13 collectively acquires the time-series past data prior to monitoring of the system. The past data acquisition unit 13 may again collectively acquire the time-series past data when some kind of event or instruction occurs during monitoring of the system.

The time-series measured data is a stream of measured data, in which each piece of measured data included is associated with a time. The measured data includes the one or more measured values output from the one or more sensors at a corresponding time. The past data is described in the same format as that of the measured data. When the measured data is vector data, for example, the past data is also vector data. In this case, each of a plurality of elements included in the past data corresponds to any sensor among a plurality of sensors installed in the system and is a measured value output from the corresponding sensor.

The past data acquisition unit 13 may acquire the time-series past data including training data used for the training of the prediction model, for example. The past data acquisition unit 13 may acquire the time-series past data including the training data in its entirety or acquire the time-series past data partially including the training data.

The predicted data generation unit 14 receives the prediction model from the model acquisition unit 12. Further, the predicted data generation unit 14 receives the time series measured data from the measured data acquisition unit 11. The predicted data generation unit 14 generates the time-series predicted data in the same period as the time-series measured data based on the time-series measured data and the prediction model.

The predicted data generation unit 14 receives the measured data from the measured data acquisition unit 11 successively in real time, for example. In this case, the predicted data generation unit 14 successively generates the predicted data at the same time as the time of the received measured data. Thus, the predicted data generation unit 14 can generate the time-series predicted data in the same period as the time-series measured data.

The predicted data generation unit 14, when using the measured data at one or more times up to the present in order to generate the predicted data at each time, buffers the measured data at the one or more times received until then. When the prediction model is the autoencoder, the predicted data generation unit 14 generates the predicted data at each time based on the measured data at the same time and thus does not need buffer the measured data received previously.

The image generation unit 15 receives the time-series measured data from the measured data acquisition unit 11, the time-series past data from the past data acquisition unit 13, and the time-series predicted data from the predicted data generation unit 14. The image generation unit 15 generates a displayed image to be presented to the user based on these pieces of data.

The image generation unit 15, for each of the one or more sensors installed in the system to be monitored, generates a display image including a past value graph, a measured value graph, a predicted value graph, past distribution information, and measurement distribution information, for example.

The past value graph is a graph representing temporal change in the measured value included in the time-series past data in a first period for the corresponding sensor. The past value graph is a graph representing time on its horizontal axis and the value (the measured value) on its vertical axis, for example.

The measured value graph is a graph representing temporal change in the measured value included in the time-series measured data in a second period after the first period for the corresponding sensor. The measured value graph is a graph representing time on its horizontal axis and the value (the measured value) on its vertical axis, for example.

The predicted value graph is a graph representing temporal change in the predicted value included in the time-series predicted data in the second period for the corresponding sensor. The measured value graph is a graph representing time on its horizontal axis and the value (the predicted value) on its vertical axis, for example.

The past distribution information is information representing a distribution of the measured value for the corresponding sensor included in the time-series past data in the first period. The past distribution information is a past distribution graph representing a histogram or probability density representing the distribution of the measured value for the corresponding sensor included in the time-series past data in the first period, for example. The horizontal axis of the past distribution graph represents frequency or probability, whereas the vertical axis thereof represents the value (the measured value), for example. In this case, the past distribution graph is represented such that the scale of the axis representing the value (the vertical axis) matches the scale of the vertical axis representing the value of the past value graph.

The measurement distribution information is information representing a distribution of the measured value for the corresponding sensor included in the time-series measured data in the second period. The measurement distribution information is a measurement distribution graph representing a histogram or probability density representing the distribution of the measured value for the corresponding sensor included in the time-series measured data in the second period, for example. The horizontal axis of the measurement distribution graph represents frequency or probability, whereas the vertical axis thereof represents the value (the measured value), for example. In this case, the measurement distribution graph is represented such that the scale of the axis representing the value (the vertical axis) matches the scale of the vertical axis representing the value of the measured value graph.

The image generation unit 15 generates the displayed image for at least one sensor (a first sensor, for example) among the one or more sensors. The image generation unit 15, when a plurality of sensors are installed in the system to be monitored, may generate the displayed image for all the plurality of sensors or generate the displayed image for part of the plurality of sensors, for example.

The displayed image may be an image displayed in one frame or window or an image displayed in a plurality of frames or windows in a divided manner. Consequently, the image generation unit 15 may generate the displayed image including the past value graph, the measured value graph, the predicted value graph, the past distribution information, and the measurement distribution information in one frame or window or generate the displayed image displaying the past value graph, the measured value graph, the predicted value graph, the past distribution information, and the measurement distribution information in the frames or windows in a divided manner.

The image generation unit 15 may generate the displayed image further including a difference graph. The difference graph is a graph representing temporal change in a difference value included in time-series difference data in the second period for the corresponding sensor. The difference graph is a graph having time on its horizontal axis and the value (the difference value) on its vertical axis, for example. The time-series difference data is a stream of data obtained by subtraction between the time-series measured data and the time-series predicted data for each time, and each piece of difference data included is associated with a time. The difference data includes one or more difference values corresponding to the one or more sensors. Each of the one or more difference values is a value obtained by subtracting the predicted value of the corresponding sensor included in the predicted data from the measured value of the corresponding sensor included in the measured data. On the contrary, the measured value may be subtracted from the predicted value.

The display control unit 16 receives the displayed image from the image generation unit 15. The display control unit 16 causes a monitor to display the received displayed image. The display control unit 16 may be implemented in an apparatus different from the other components. It is assumed that the measured data acquisition unit 11, the model acquisition unit 12, the past data acquisition unit 13, the predicted data generation unit 14, and the image generation unit 15 are implemented in a server apparatus or a host apparatus on a network, for example; in this case, the display control unit 16 may be implemented in a client apparatus or a terminal apparatus performing communication with the server apparatus or the host apparatus to execute image processing.

Figure 2:
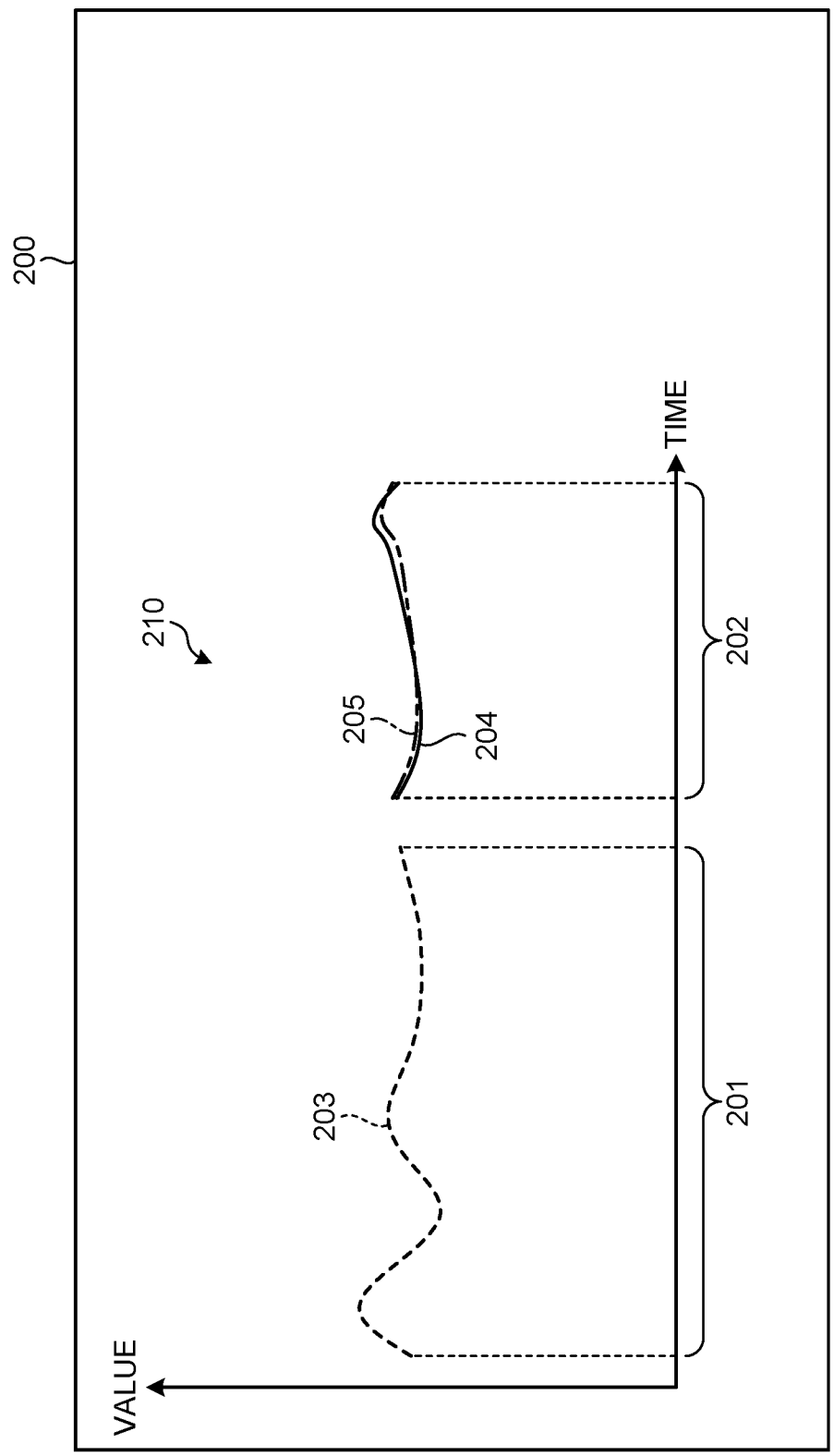
FIG. 2 is a diagram of a first displayed image.

FIG. 2 is a diagram of a first displayed image 200. The monitoring apparatus 10 displays the displayed image including the first displayed image 200 illustrated in FIG. 2, for example.

The first displayed image 200 includes a first past value graph 203, a first measured value graph 204, and a first predicted value graph 205.

The first past value graph 203 is an exemplary past value graph for the first sensor as one of the one or more sensors. The first measured value graph 204 is an exemplary measured value graph for the first sensor. The first predicted value graph 205 is an exemplary predicted value graph for the first sensor.

The first past value graph 203 represents temporal change in a measured value output from the first sensor in a first period 201. The first measured value graph 204 represents temporal change in the measured value output from the first sensor in a second period 202 after the first period 201. The first predicted value graph 205 represents temporal change in a predicted value predicted to be output from the first sensor in the second period 202. That is to say, the first predicted value graph 205 represents temporal change in the predicted value predicted to be output from the first sensor in the same period as the first measured value graph 204.

When the monitoring apparatus 10 is acquiring the measured data for each prescribed period in real time, for example, the time of the last measured value and predicted value in the second period 202 is a time at which the measured data is acquired nearest to the current time. The time of the last measured value in the first period 201 is before the time of the first measured value in the second period 202. The length of the first period 201 and the length of the second period 202 may be different from each other.

The first displayed image 200 includes a first drawing area 210. In the first drawing area 210, the horizontal axis represents a time axis, whereas the vertical axis represents the value. The monitoring apparatus 10 draws the first past value graph 203, the first measured value graph 204, and the first predicted value graph 205 in the first drawing area 210. That is to say, in the example in FIG. 2, the first past value graph 203, the first measured value graph 204, and the first predicted value graph 205 are drawn on the common time axis.

The monitoring apparatus 10 displays such a first displayed image 200 and thereby enables the user to easily grasp a difference in trend between the temporal change in the measured value in the first period 201 and the temporal change in the measured value in the second period 202 for the first sensor. Further, the monitoring apparatus 10 enables the user to easily grasp a difference in trend between the temporal change in the measured value and the temporal change in the predicted value in the second period 202 for the first sensor.

Figure 3:
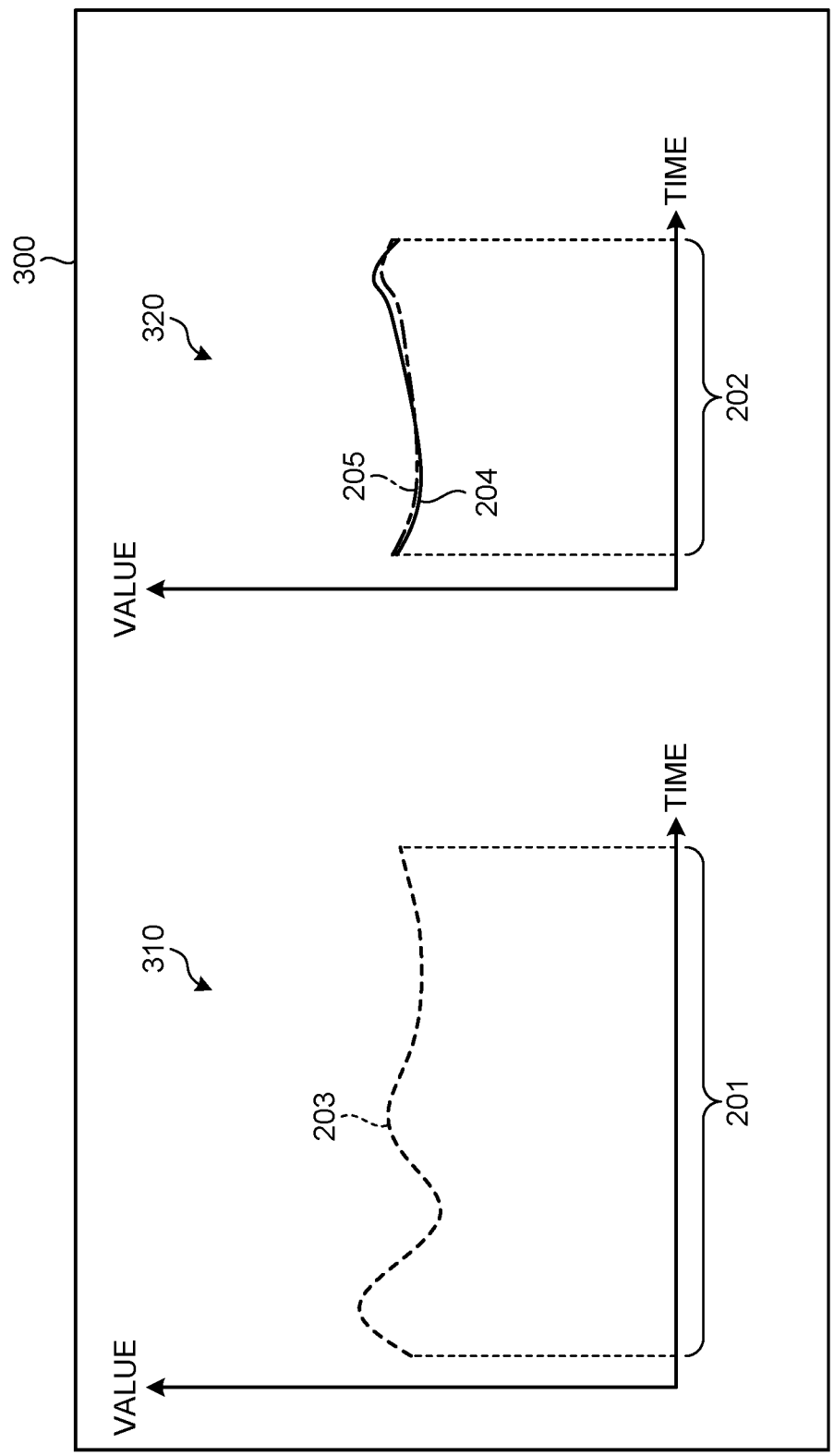
FIG. 3 is a diagram of a second displayed image.

FIG. 3 is a diagram of a second displayed image 300. The monitoring apparatus 10 may display the displayed image including the second displayed image 300 illustrated in FIG. 3, for example.

The second displayed image 300 includes the first past value graph 203, the first measured value graph 204, and the first predicted value graph 205.

The second displayed image 300 includes a second drawing area 310 and a third drawing area 320. In the second drawing area 310, the horizontal axis represents a time axis covering the first period 201, whereas the vertical axis represents the value. In the third drawing area 320, the horizontal axis represents a time axis covering the second period 202, whereas the vertical axis represents the value. The monitoring apparatus 10 draws the first past value graph 203 in the second drawing area 310 and draws the first measured value graph 204 and the first predicted value graph 205 in the third drawing area 320. That is to say, in the example in FIG. 3, the first past value graph 203 and the first measured value graph 204 and the first predicted value graph 205 are drawn on different time axes. However, the second drawing area 310 and the third drawing area 320 are placed such that their vertical axis scales and value positions match.

The monitoring apparatus 10 displays such a second displayed image 300 and thereby enables the user to easily grasp a difference in trend between the temporal change in the measured value in the first period 201 and the temporal change in the measured value in the second period 202 for the first sensor. Further, the monitoring apparatus 10 enables the user to easily grasp a difference in trend between the temporal change in the measured value and the temporal change in the predicted value in the second period 202 for the first sensor.

Figure 4:
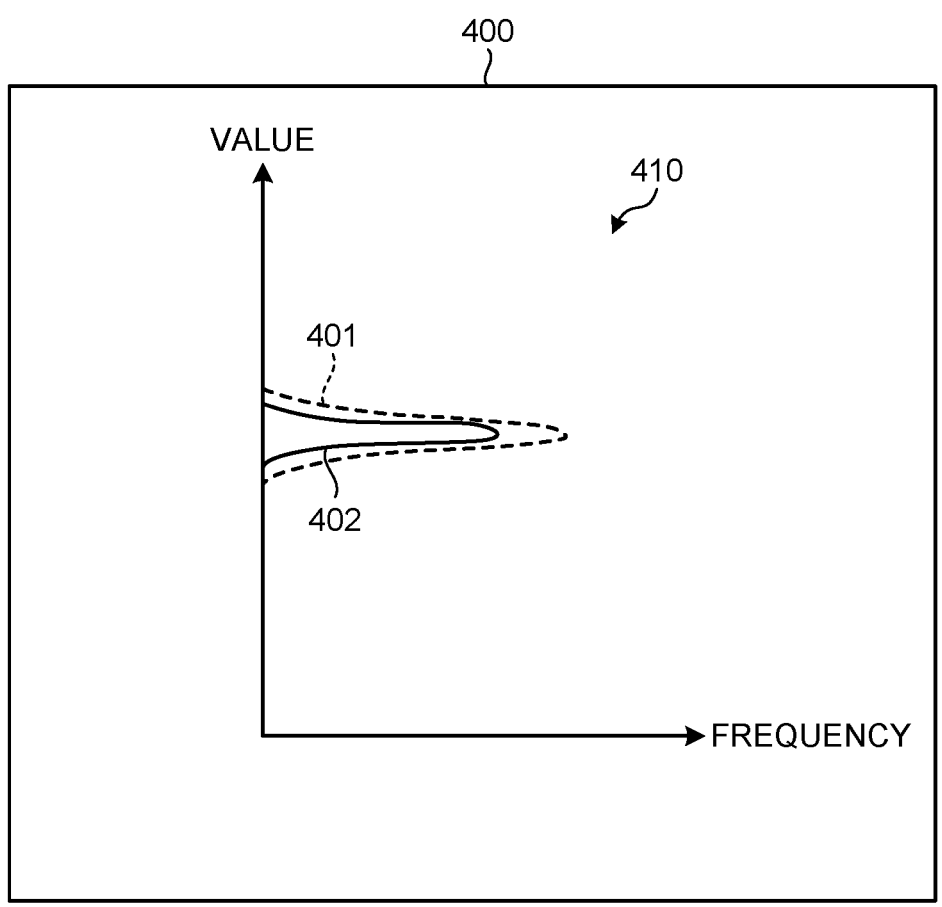
FIG. 4 is a diagram of a third displayed image.

FIG. 4 is a diagram of a third displayed image 400. The monitoring apparatus 10 may display the displayed image including the third displayed image 400 illustrated in FIG. 4, for example.

The third displayed image 400 includes a first past distribution graph 401 and a first measurement distribution graph 402.

The first past distribution graph 401 is exemplary past distribution information for the first sensor. More specifically, the first past distribution graph 401 is a histogram representing the frequencies of the respective measured values output from the first sensor in the first period 201.

The first measurement distribution graph 402 is exemplary measurement distribution information for the first sensor. More specifically, the first measurement distribution graph 402 is a histogram representing the frequencies of the respective measured values output from the first sensor in the second period 202.

The third displayed image 400 includes a fourth drawing area 410. In the fourth drawing area 410, the horizontal axis represents the frequency, whereas the vertical axis represents the value. The monitoring apparatus 10 draws the first past distribution graph 401 and the first measurement distribution graph 402 in the fourth drawing area 410. That is to say, in the example in FIG. 4, the first past distribution graph 401 and the first measurement distribution graph 402 are drawn on the common value axis.

The monitoring apparatus 10 displays such a third displayed image 400 and thereby enables the user to easily grasp a difference between a distribution of the measured value of the first sensor in the first period 201 and a distribution of the measured value of the first sensor in the second period 202.

Figure 5:
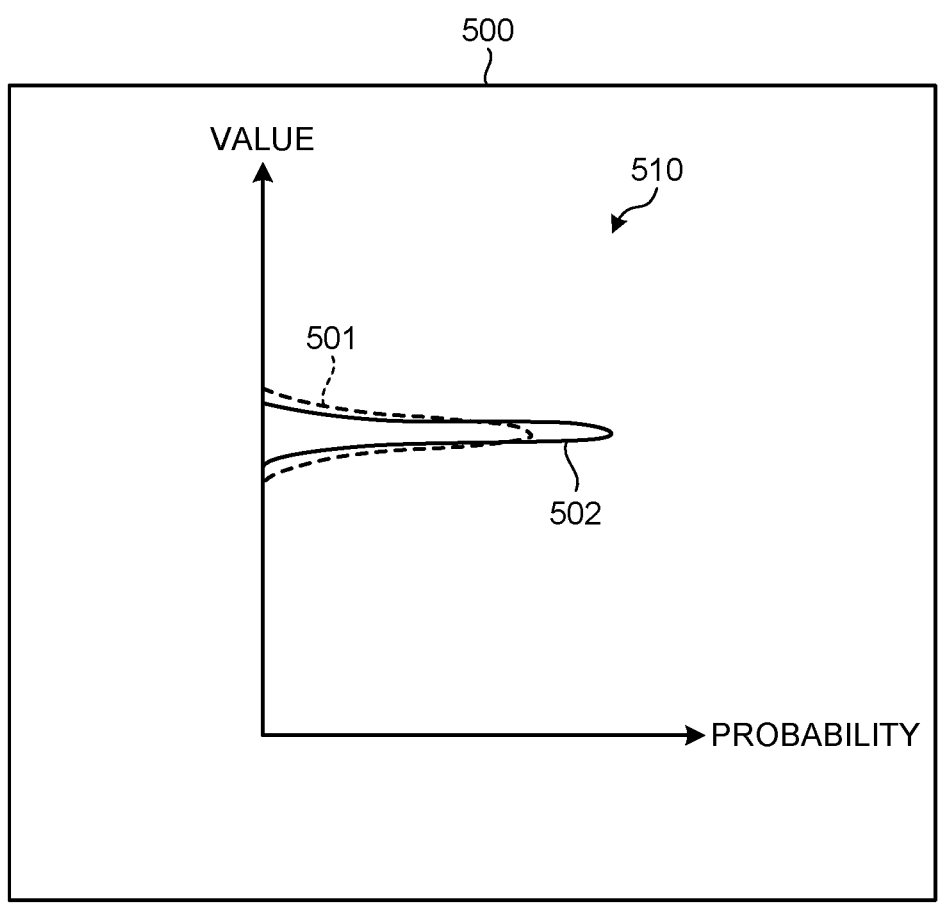
FIG. 5 is a diagram of a fourth displayed image.

FIG. 5 is a diagram of a fourth displayed image 500. The monitoring apparatus 10 may display the displayed image including the fourth displayed image 500 illustrated in FIG. 5, for example.

The fourth displayed image 500 includes a second past distribution graph 501 and a second measurement distribution graph 502.

The second past distribution graph 501 is exemplary past distribution information for the first sensor. More specifically, the second past distribution graph 501 is a discrete probability distribution representing the probabilities of the respective measured values output from the first sensor in the first period 201.

The second measurement distribution graph 502 is exemplary measurement distribution information for the first sensor. More specifically, the second measurement distribution graph 502 is a discrete probability distribution representing the probabilities of the respective measured values output from the first sensor in the second period 202.

The fourth displayed image 500 includes a fifth drawing area 510. In the fifth drawing area 510, the horizontal axis represents the probability, whereas the vertical axis represents the value. The monitoring apparatus 10 draws the second past distribution graph 501 and the second measurement distribution graph 502 in the fifth drawing area 510. That is to say, in the example in FIG. 5, the second past distribution graph 501 and the second measurement distribution graph 502 are drawn on the common value axis.

The monitoring apparatus 10 displays such a fourth displayed image 500 and thereby enables the user to easily grasp the difference between the distribution of the measured value of the first sensor in the first period 201 and the distribution of the measured value of the first sensor in the second period 202.

Figure 6:
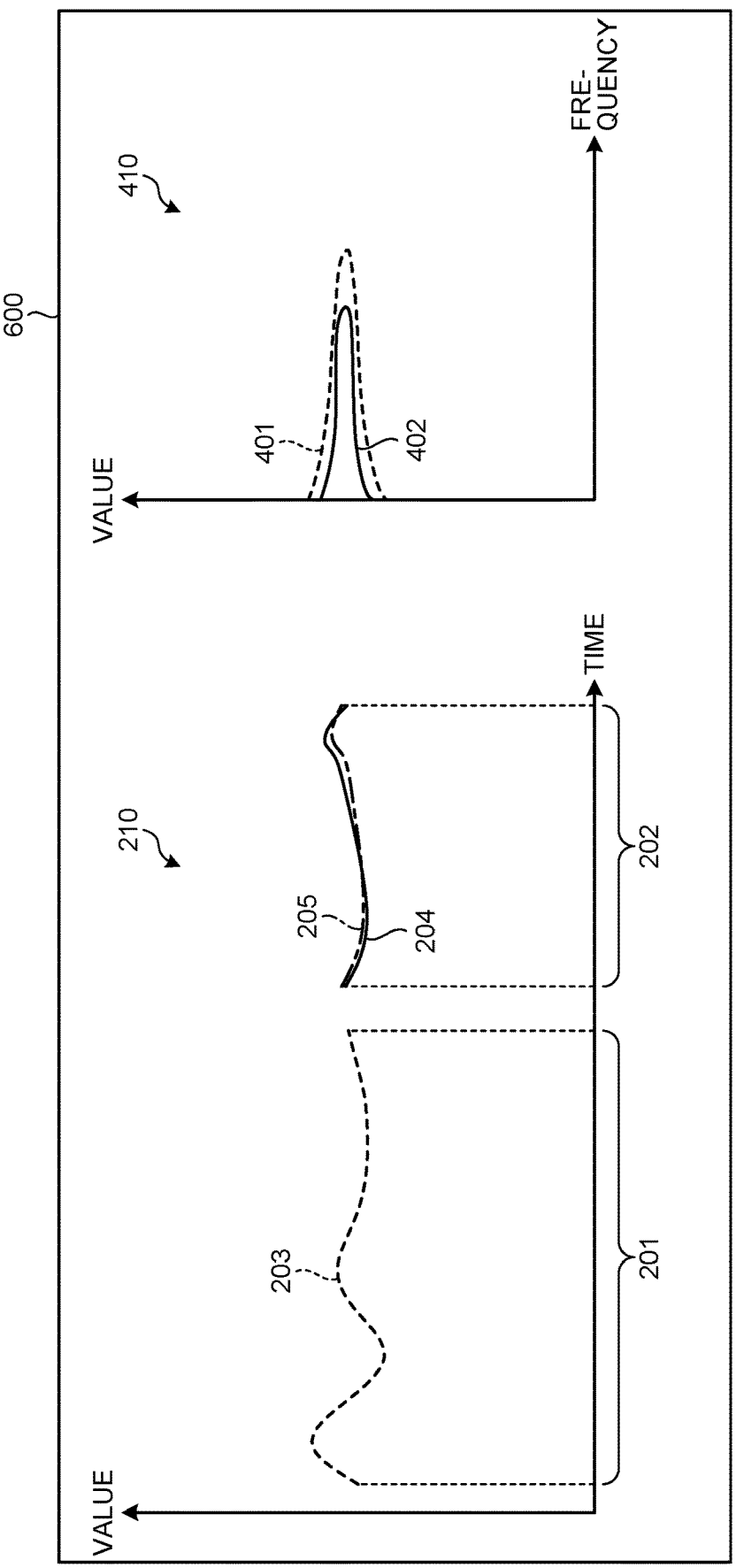
FIG. 6 is a diagram of a fifth displayed image.

FIG. 6 is a diagram of a fifth displayed image 600. The monitoring apparatus 10 may display the fifth displayed image 600 illustrated in FIG. 6 as the displayed image, for example.

The fifth displayed image 600 includes the first past value graph 203, the first measured value graph 204, the first predicted value graph 205, the first past distribution graph 401, and the first measurement distribution graph 402.

The fifth displayed image 600 includes the first drawing area 210 and the fourth drawing area 410. The monitoring apparatus 10 draws the first past value graph 203, the first measured value graph 204, and the first predicted value graph 205 in the first drawing area 210. The monitoring apparatus 10 draws the first past distribution graph 401 and the first measurement distribution graph 402 in the fourth drawing area 410.

In the fifth displayed image 600, the first drawing area 210 and the fourth drawing area 410 are placed such that their vertical axis scales and value positions match. The monitoring apparatus 10 displays the fifth displayed image 600 and thereby enables the user to easily grasp a difference between the shape of a frequency distribution of the measured value in the first period 201 and the shape of a frequency distribution of the measured value in the second period 202 and a difference between an average of the measured value in the first period 201 and an average of the measured value in the second period 202 for the first sensor.

In the examples in FIG. 6, as can be seen from the first measurement distribution graph 402 and the first past distribution graph 401, the average in the first period 201 and the average in the second period 202 for the measured value of the first sensor are substantially the same. Consequently, the user checks the fifth displayed image 600 in FIG. 6 and can thereby easily grasp that.

Figure 7:
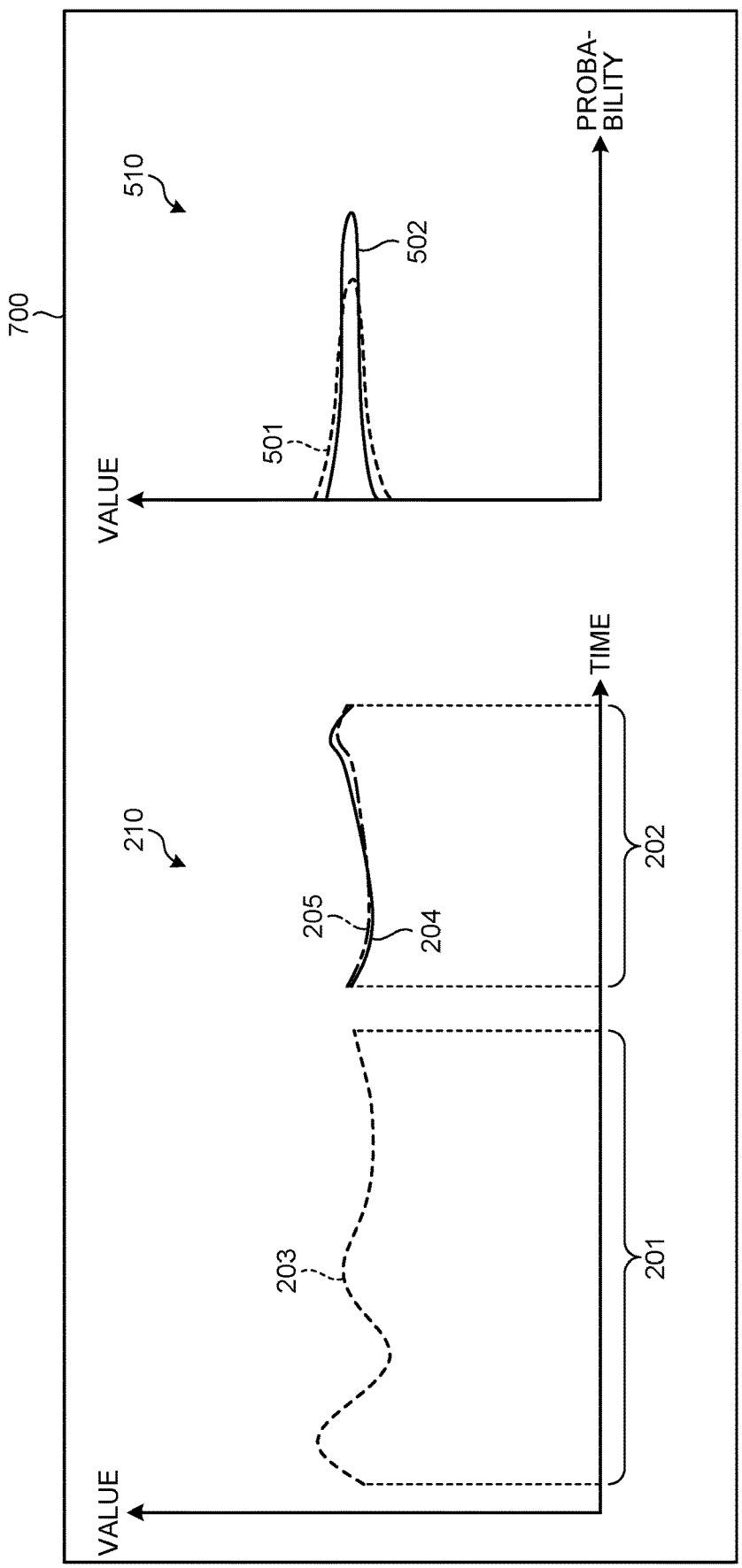
FIG. 7 is a diagram of a sixth displayed image.

FIG. 7 is a diagram of a sixth displayed image 700. The monitoring apparatus 10 may display the sixth displayed image 700 illustrated in FIG. 7 as the displayed image, for example.

The sixth displayed image 700 includes the first past value graph 203, the first measured value graph 204, the first predicted value graph 205, the second past distribution graph 501, and the second measurement distribution graph 502.

The sixth displayed image 700 includes the first drawing area 210 and the fifth drawing area 510. The monitoring apparatus 10 draws the first past value graph 203, the first measured value graph 204, the first predicted value graph 205 in the first drawing area 210. The monitoring apparatus 10 draws the second past distribution graph 501 and the second measurement distribution graph 502 in the fifth drawing area 510.

In the sixth displayed image 700, the first drawing area 210 and the fifth drawing area 510 are placed such that their vertical axis scales and value positions match. The monitoring apparatus 10 displays the sixth displayed image 700 and thereby enables the user to easily grasp a difference between the shape of a probability distribution of the measured value in the first period 201 and the shape of a probability distribution of the measured value in the second period 202 and a difference between the average of the measured value in the first period 201 and the average of the measured value in the second period 202 for the first sensor.

In the example in FIG. 7, the second measurement distribution graph 502 and the second past distribution graph 501 are substantially the same. Consequently, the user checks the sixth displayed image 700 in FIG. 7 and can thereby easily grasp that the probability distributions of the measured value of the first sensor in the first period 201 and the second period 202 are substantially the same. The user can also grasp that the average values of the measured value of the first sensor in the first period 201 and the second period 202 are substantially the same.

Figure 8:
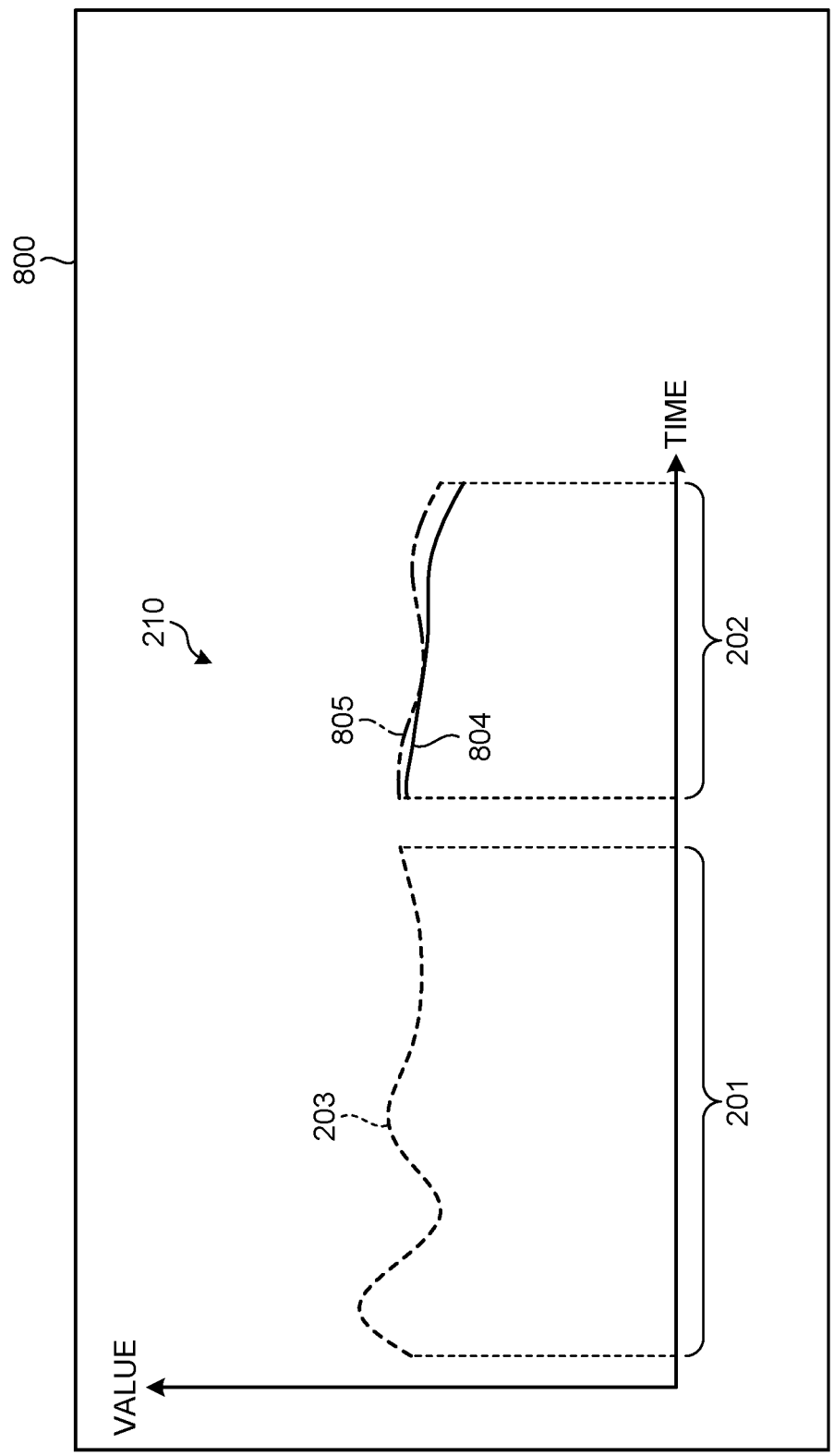
FIG. 8 is a diagram of a seventh displayed image.

FIG. 8 is a diagram of a seventh displayed image 800. The monitoring apparatus 10 displays the displayed image including the seventh displayed image 800 illustrated in FIG. 8, for example. The seventh displayed image 800 is an example when the average of the measured value in the second period 202 is smaller than the average of the predicted value.

The seventh displayed image 800 includes the first past value graph 203, a second measured value graph 804, and a second predicted value graph 805. The monitoring apparatus 10 includes the first drawing area 210. The monitoring apparatus 10 draws the first past value graph 203, the second measured value graph 804, and the second predicted value graph 805 in the first drawing area 210.

The second measured value graph 804 is an exemplary measured value graph for the first sensor in the second period 202 and is different in the value from the first measured value graph 204 illustrated in FIG. 2. The second predicted value graph 805 is an exemplary predicted value graph for the first sensor in the second period 202 and is different in the value from the first predicted value graph 205 illustrated in FIG. 2.

In the example in FIG. 8, the user checks the seventh displayed image 800 in FIG. 8 and can thereby easily grasp temporal change in the measured value and the predicted value of the first sensor in the second period 202.

Figure 9:
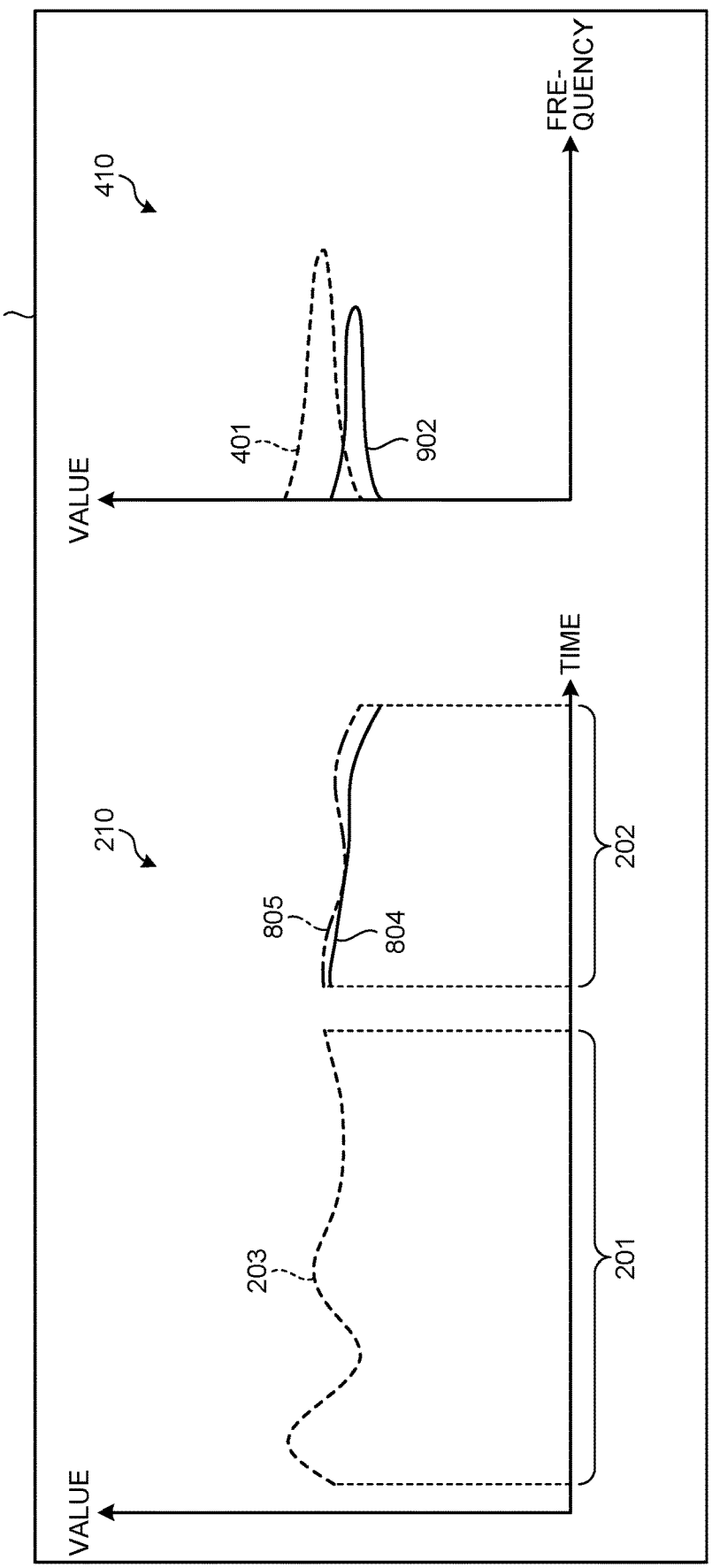
FIG. 9 is a diagram of an eighth displayed image.

FIG. 9 is a diagram of an eighth displayed image 900. The monitoring apparatus 10 displays the eighth displayed image 900 illustrated in FIG. 9 as the displayed image, for example. The eighth displayed image 900 is an example when the average of the measured value in the second period 202 is smaller than the average of the predicted value.

The eighth displayed image 900 includes the first past value graph 203, the second measured value graph 804, the second predicted value graph 805, the first past distribution graph 401, and a third measurement distribution graph 902. The third measurement distribution graph 902 is a histogram representing the frequencies of the respective measured values output from the first sensor in the second period 202 shown by the second measured value graph 804.

The eighth displayed image 900 includes the first drawing area 210 and the fourth drawing area 410. The monitoring apparatus 10 draws the first past value graph 203, the second measured value graph 804, and the second predicted value graph 805 in the first drawing area 210 and draws the first past distribution graph 401 and the third measurement distribution graph 902 in the fourth drawing area 410.

In the example in FIG. 9, as can be seen from a comparison between the third measurement distribution graph 902 and the first past distribution graph 401, the average of the measured value of the first sensor in the second period 202 is smaller than the average in the first period 201. The user checks the eighth displayed image 900 in FIG. 9 and can thereby easily grasp that the average of the measured value in the second period 202 is smaller than the average of the measured value in the first period 201 for the first sensor.

Figure 10:
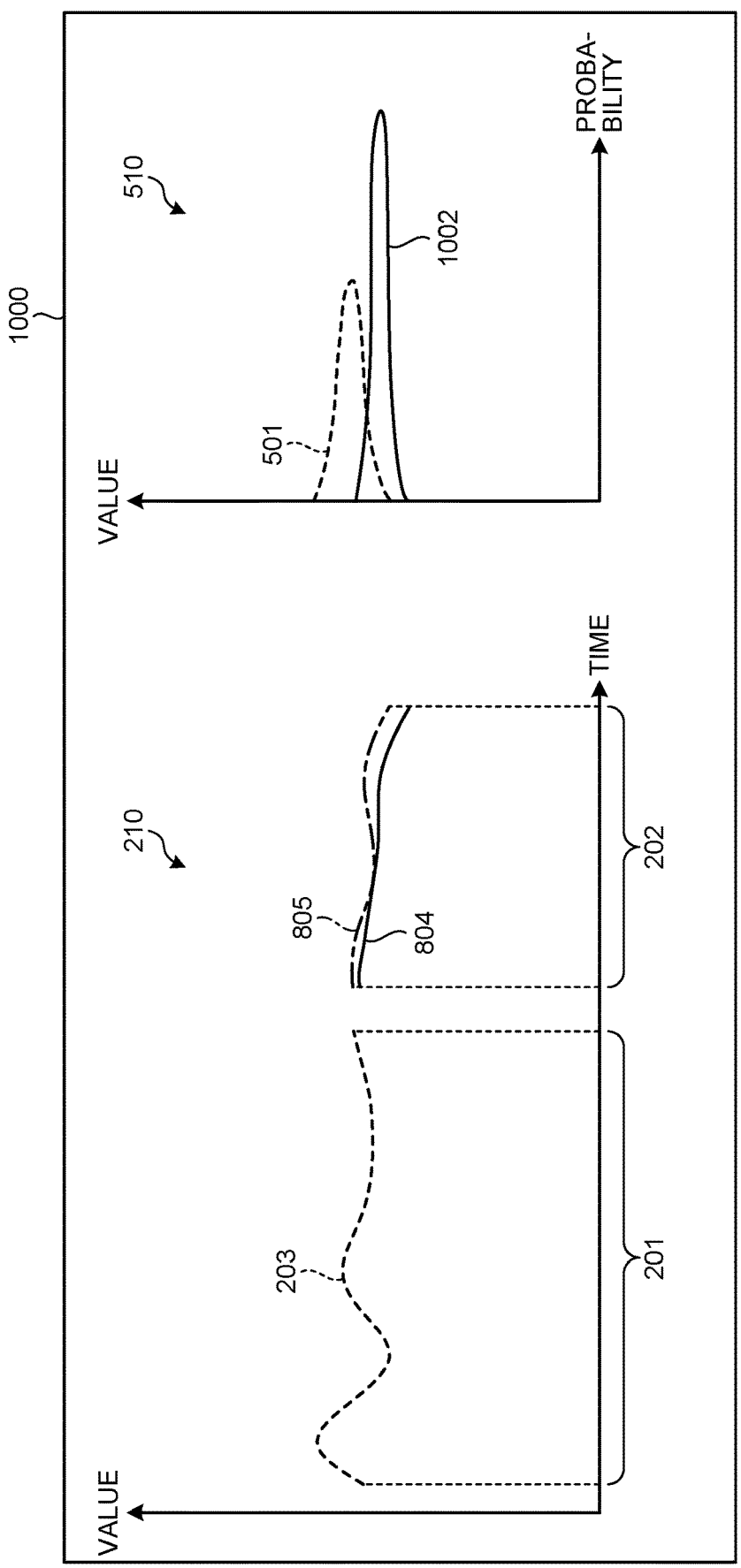
FIG. 10 is a diagram of a ninth displayed image.

FIG. 10 is a diagram of a ninth displayed image 1000. The ninth displayed image 1000 illustrated in FIG. 10 is displayed as the displayed image, for example. The ninth displayed image 1000 is an example when the average of the measured value in the second period 202 is smaller than the average of the predicted value.

The ninth displayed image 1000 includes the first past value graph 203, the second measured value graph 804, the second predicted value graph 805, the second past distribution graph 501, and a fourth measurement distribution graph 1002. The fourth measurement distribution graph 1002 is a discrete probability distribution representing the probabilities of the respective measured values output from the first sensor in the second period 202 shown by the second measured value graph 804.

The ninth displayed image 1000 includes the first drawing area 210 and the fifth drawing area 510. The monitoring apparatus 10 draws the first past value graph 203, the second measured value graph 804, and the second predicted value graph 805 in the first drawing area 210 and draws the second past distribution graph 501 and the fourth measurement distribution graph 1002 in the fifth drawing area 510.

In the example in FIG. 10, the fourth measurement distribution graph 1002 has a smaller average and a different shape of the probability distribution compared with the second past distribution graph 501. The user checks the ninth displayed image 1000 in FIG. 10 and can thereby easily grasp that the shape of the probability distribution of the measured value in the second period 202 and the shape of the probability distribution of the measured value in the first period 201 are different from each other and that the average of the measured value in the second period 202 is smaller than the average of the measured value in the first period 201.

Figure 11:
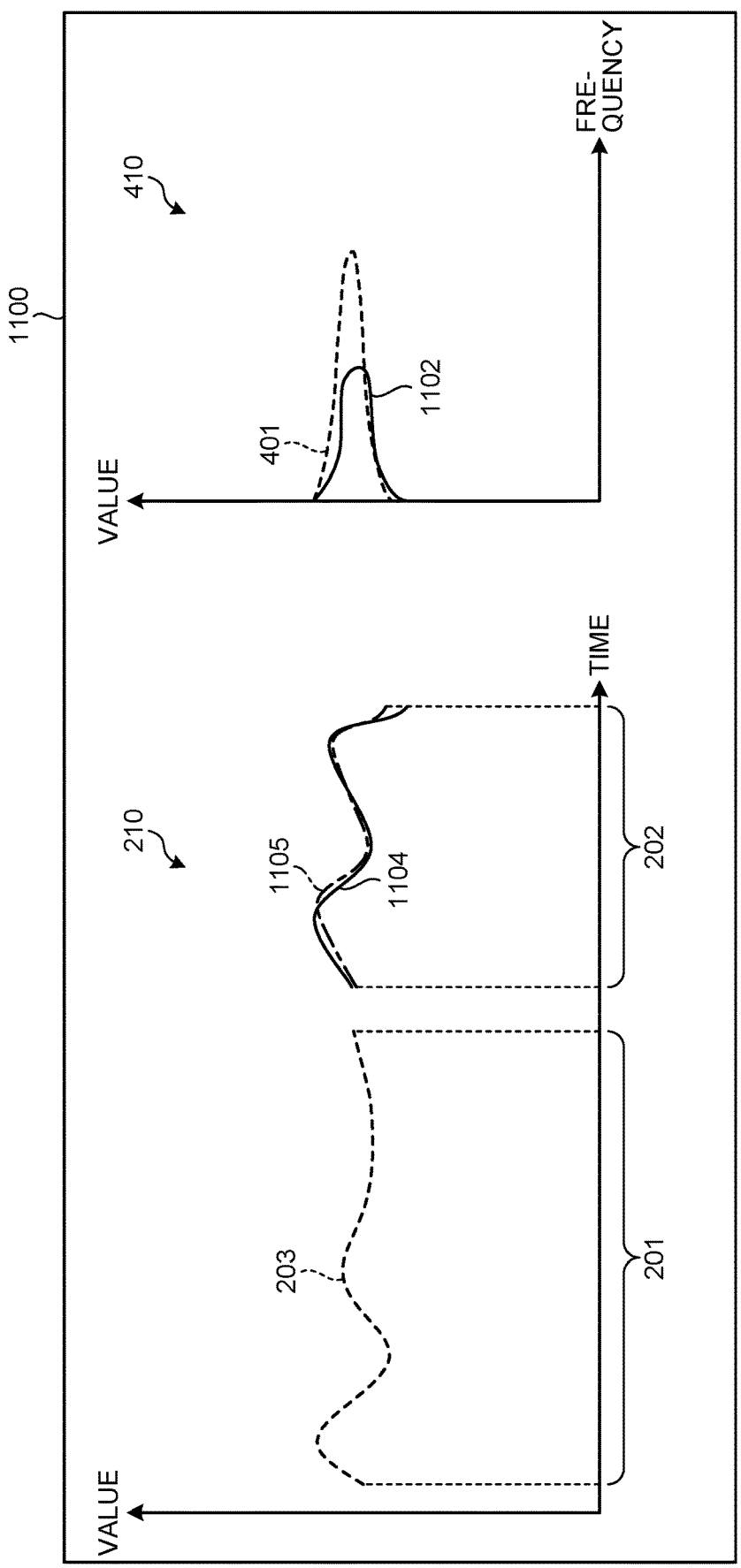
FIG. 11 is a diagram of a 10th displayed image.

FIG. 11 is a diagram of a 10th displayed image 1100. The monitoring apparatus 10 displays the 10th displayed image 1100 illustrated in FIG. 11 as the displayed image, for example. The 10th displayed image 1100 is an example when there is not much difference between the average of the measured value and the average of the predicted value in the second period 202 and the measured value and the predicted value deviate from each other at an end part of the second period 202.

The 10th displayed image 1100 includes the first past value graph 203, a third measured value graph 1104, a third predicted value graph 1105, the first past distribution graph 401, and a fifth measurement distribution graph 1102.

The third measured value graph 1104 is an exemplary measured value graph for the first sensor in the second period 202 and is different in the value from the first measured value graph 204 illustrated in FIG. 2 and the second measured value graph 804 illustrated in FIG. 8. The third predicted value graph 1105 is an exemplary predicted value graph for the first sensor in the second period 202 and is different in the value from the first predicted value graph 205 illustrated in FIG. 2 and the second predicted value graph 805 illustrated in FIG. 8.

The fifth measurement distribution graph 1102 is a histogram representing the frequencies of the respective measured values output from the first sensor in the second period 202 shown by the third measured value graph 1104.

The 10th displayed image 1100 includes the first drawing area 210 and the fourth drawing area 410. The monitoring apparatus 10 draws the first past value graph 203, the third measured value graph 1104, and the third predicted value graph 1105 in the first drawing area 210 and draws the first past distribution graph 401 and the fifth measurement distribution graph 1102 in the fourth drawing area 410.

In the example in FIG. 11, as can be seen from a comparison between the third measured value graph 1104 and the third predicted value graph 1105, the measured value of the first sensor deviates from the predicted value at the end part of the second period 202. The user checks the 10th displayed image 1100 in FIG. 11 and can thereby easily grasp that.

In the example in FIG. 11, as can be seen from the fifth measurement distribution graph 1102 and the first past distribution graph 401, the averages of the measured value of the first sensor in the second period 202 and the first period 201 are substantially the same. The user checks the 10th displayed image 1100 in FIG. 11 and can thereby easily grasp that.

Figure 12:
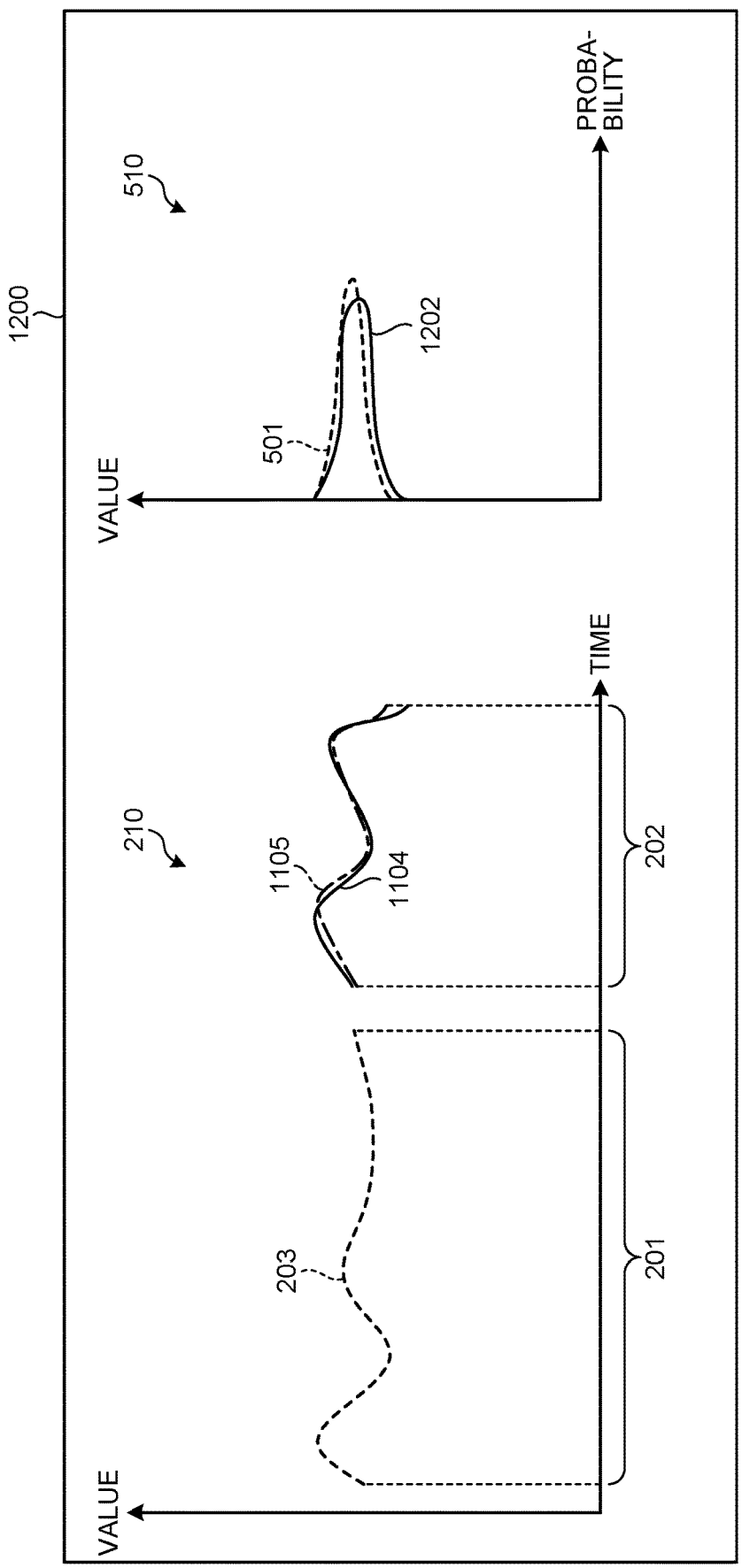
FIG. 12 is a diagram of an 11th displayed image.

FIG. 12 is a diagram of an 11th displayed image 1200. The monitoring apparatus 10 displays the 11th displayed image 1200 illustrated in FIG. 12 as the displayed image, for example. The 11th displayed image 1200 is an example when there is not much difference between the average of the measured value and the average of the predicted value in the second period 202 and the measured value and the predicted value deviate from each other at the end part of the second period 202.

The 11th displayed image 1200 includes the first past value graph 203, the third measured value graph 1104, the third predicted value graph 1105, the second past distribution graph 501, and a sixth measurement distribution graph 1202. The sixth measurement distribution graph 1202 is a discrete probability distribution of the probabilities of the respective measured values output from the first sensor in the second period 202 shown by the third measured value graph 1104.

The 11th displayed image 1200 includes the first drawing area 210 and the fifth drawing area 510. The monitoring apparatus 10 draws the first past value graph 203, the third measured value graph 1104, and the third predicted value graph 1105 in the first drawing area 210 and draws the second past distribution graph 501 and the sixth measurement distribution graph 1202 in the fifth drawing area 510.

In the example in FIG. 12, as can be seen from the third measured value graph 1104 and the third predicted value graph 1105, the measured value and the predicted value of the first sensor deviate from each other at the end part of the second period 202. The user checks the 11th displayed image 1200 in FIG. 12 and can thereby easily grasp that.

In the example in FIG. 12, the shapes of the sixth measurement distribution graph 1202 and the second past distribution graph 501 are substantially the same. The user checks the 11th displayed image 1200 in FIG. 12 and can thereby easily grasp that. The user can thereby at the same time grasp that the average in the second period 202 and the average in the first period 201 for the measured value of the first sensor are substantially the same.

Effects of First Embodiment

It is assumed that device replacement is performed for system maintenance between the first period 201 as an acquisition period for the time-series past data and the second period 202 as an acquisition period for the time-series measured data. Further, it is assumed that the measured value of the first sensor has deviated from the predicted value by a certain value or more at the end of the second period 202. FIG. 9 and FIG. 10 are exemplary displayed images in such a case. The time of the end of the second period 202 is a time at which the measured data acquisition unit 11 acquired the measured data at a time closest to the current time.

Both a monitor of the system who has not used the monitoring apparatus 10 and the user as a monitor who has used it realize that the measured value of the first sensor deviates from the predicted value at the end of the second period 202. The monitor who has not used the monitoring apparatus 10 suspects that a causal event occurred near the end of the second period 202, at which the deviation between the measured value and the predicted value is detected. On the other hand, the user as the monitor who has used the monitoring apparatus 10 checks the eighth displayed image 900 illustrated in FIG. 9 or the ninth displayed image 1000 illustrated in FIG. 10, for example, displayed by the monitoring apparatus 10 to realize that the average shifted between the first period 201 and the second period 202.

Thus, the user can suspect that an event causing the deviation between the measured value and the predicted value occurred near a boundary between the first period 201 and the second period 202. If the user knows that a device replacement is performed between the first period 201 and the second period 202, the user can determine that the cause of the deviation is not a device breakdown but the device replacement for system maintenance. Consequently, the user can determine that there is no need to stop the system and to repair any device. The monitoring apparatus 10 can thus reduce time and effort to determine the cause of the deviation between the measured value and the predicted value by the user and reduce the time to determine the cause.

FIG. 11 and FIG. 12 are exemplary displayed images when a device in the system broke down immediately before the end of the second period 202, and the measured value of the first sensor has deviated from the predicted value at the end of the second period 202 owing to the breakdown.

Both the monitor of the system who has not used the monitoring apparatus 10 and the user as the monitor who has used it suspect that a causal event occurred near the end of the second period 202, at which the deviation is detected. The user as the monitor who has used the monitoring apparatus 10 checks the 10th displayed image 1100 illustrated in FIG. 11 or the 11th displayed image 1200 illustrated in FIG. 12, for example, displayed by the monitoring apparatus 10 to realize that the average of the measured value did not significantly shift between the first period 201 and the second period 202.

Thus, the user can presume that the event causing the deviation between the measured value and the predicted value occurred not near the boundary between the first period 201 and the second period 202 but near the end of the second period 202. There is no difference between the user as the monitor who has used the monitoring apparatus 10 and the monitor who has not used it in suspecting the event near the end of the second period 202 as the cause of the deviation. However, the monitor who has not used the monitoring apparatus 10 cannot exclude an event near the boundary between the first period 201 and the second period 202 from candidates for the cause, whereas when the monitoring apparatus 10 has been used, the event near the boundary between the first period 201 and the second period 202 can be excluded from the candidates for the cause. That is to say, the monitor who has not used the monitoring apparatus 10 must do work for determining that the device replacement between the first period 201 and the second period 202 is not the cause. On the other hand, the user as the monitor who has used the monitoring apparatus 10 need not determine that the device replacement is not the cause. The monitoring apparatus 10 can thus reduce time and effort to determine the cause of the deviation between the measured value and the predicted value by the user and reduce the time to determine the cause.

As in the foregoing, the monitoring apparatus 10 according to the present embodiment can present the information to determine whether the deviation between the measured data and predicted data output from the one or more sensors installed in the system to be monitored is caused by the system being not in a sound condition to the user. Thus, the monitoring apparatus 10 according to the present embodiment can improve usability.

Second Embodiment

The following describes the monitoring apparatus 10 according to a second embodiment. The monitoring apparatus 10 according to the second embodiment has substantially the same function and configuration as those of the first embodiment. In the description of the second embodiment, parts having substantially the same function and configuration as those of the first embodiment are denoted by the same symbols, and a detailed description is omitted except differences.

Figure 13:
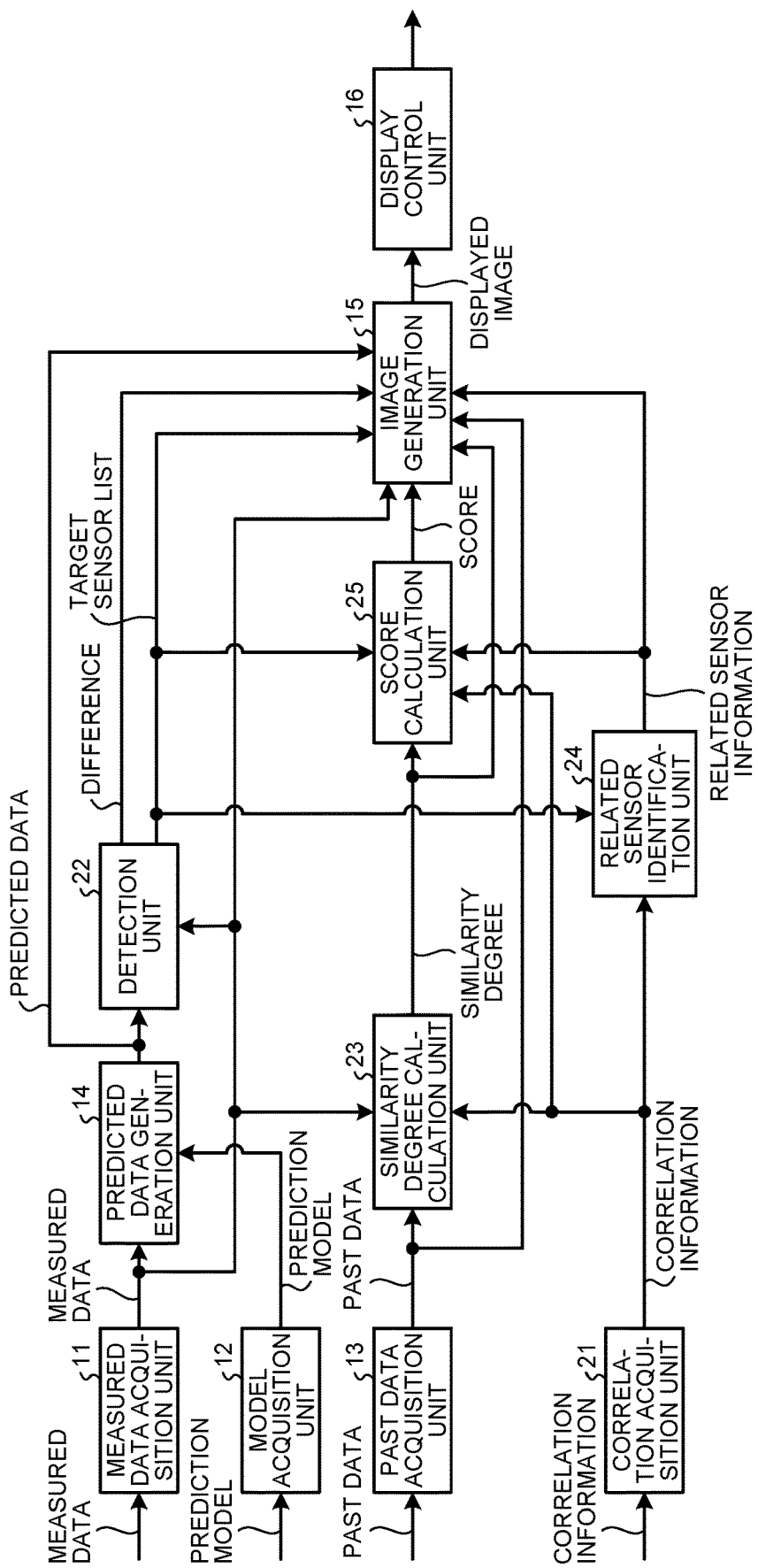
FIG. 13 is a diagram of a configuration of the monitoring apparatus according to a second embodiment.

FIG. 13 is a diagram of a configuration of the monitoring apparatus 10 according to the second embodiment. The monitoring apparatus 10 according to the second embodiment further includes a correlation acquisition unit 21, a detection unit 22, a similarity degree calculation unit 23, a related sensor identification unit 24, and a score calculation unit 25.

In the second embodiment, the system includes a plurality of sensors installed therein. The monitoring apparatus 10 acquires the measured data including a plurality of measured values each output from one of the plurality of sensors for each certain time, for example.

The correlation acquisition unit 21 acquires correlation information from the external apparatus, for example. The correlation information represents intensity of correlation for each pair of two sensors included in the plurality of sensors installed in the system. Table 1 below is exemplary correlation information.

TABLE 1

|  | Sensor 0 | Sensor 1 | . . . | Sensor N − 1 |
|---|---|---|---|---|
| Sensor 0 | 1.0 | 0.8 | . . . | 0.4 |
| Sensor 1 | 0.8 | 1.0 | . . . | 0.2 |
| . . . | . . . | . . . | . . . | . . . |
| Sensor N − 1 | 0.4 | 0.2 | . . . | 1.0 |

The intensities of the correlation of the pairs of two sensors included in the correlation information are each an absolute value of a correlation coefficient, for example, and has a value of 0 or more and 1 or less. The larger value indicates the more intense intensity of correlation.

The correlation information is calculated based on the measured value of each of the plurality of sensors in the first period 201, for example. The correlation information may be calculated based on the past data acquired by the past data acquisition unit 13.

The detection unit 22 receives the time-series measured data from the measured data acquisition unit 11 and the time-series predicted data from the predicted data generation unit 14. The detection unit 22, for each of the plurality of sensors, calculates a difference between the measured value included in the measured data at an arbitrary first time and the predicted value included in the predicted data at the first time. The detection unit 22 detects a sensor for which the calculated difference is larger than a preset first threshold or smaller than a preset second threshold among each of the plurality of sensors as a target sensor. The detection unit 22 may detect a plurality of target sensors. The second threshold is smaller than the first threshold.

When the measured data acquisition unit 11 acquires the measured data in real time, for example, the detection unit 22 calculates the difference at the time of the acquired measured data, each time the measured data acquisition unit 11 acquires the measured data. The detection unit 22 detects the target sensor, each time the measured data acquisition unit 11 acquires the measured data.

That is to say, the detection unit 22 calculates the time-series difference data obtained by subtracting the time-series predicted data from the time-series measured data for each time. Subsequently, the detection unit 22, for each element included in the difference data, that is, for each of the plurality of sensors, determines whether the difference between the measured value and the predicted value is larger than the first threshold set for the corresponding sensor or smaller than the second threshold. The detection unit 22 detects the sensor for which the difference is larger than the first threshold or smaller than the second threshold among the plurality of sensors as the target sensor.

A memory included in the monitoring apparatus 10 stores therein a group of the first thresholds each for one of the plurality of sensors and a group of the second thresholds each for one of the plurality of sensors. The detection unit 22 reads the first threshold and the second threshold for each of the plurality of sensors from the memory to detect the target sensor.

Further, the detection unit 22 generates a target sensor list describing an identifier (ID) identifying the target sensor, a name of the target sensor, and the like. The number of elements of the target sensor list is a total number of sensors for which the differences are larger than the first threshold and sensors for which the differences are smaller than the second threshold.

The similarity degree calculation unit 23 receives the time-series measured data from the measured data acquisition unit 11, the time-series past data from the past data acquisition unit 13, and the correlation information from the correlation acquisition unit 21. The similarity degree calculation unit 23, for each of the plurality of sensors, calculates a similarity degree between a distribution of the measured value of the corresponding sensor included in the time-series past data in the first period and a distribution of the measured value of the corresponding sensor included in the time-series measured data in the second period. The similarity degree calculation unit 23 may calculate the similarity degree by further using the correlation information.

When the measured data acquisition unit 11 acquires the measured data in real time, the similarity degree calculation unit 23 may calculate the similarity degree each time the measured data acquisition unit 11 acquires the measured data. The similarity degree calculation unit 23 may calculate the similarity degree each time the measured data acquisition unit 11 acquires a certain number of pieces of measured data.

The similarity degree calculation unit 23, for the first sensor, calculates the area of an overlapping area between a histogram of the corresponding measured value included in the time-series past data and a histogram of the corresponding measured value included in the time-series measured data as the similarity degree, for example. The area of the overlapping area is called a histogram intersection. The similarity degree may be a value obtained by dividing the histogram intersection by the area of the histogram of the past data or the area of the histogram of the measured data to be normalized.

The similarity degree calculation unit 23, for the first sensor, may calculate the area of an overlapping area between a discrete probability distribution of the corresponding measured value included in the time-series past data and a discrete probability distribution of the corresponding measured value included in the time-series measured data as the similarity degree, for example. The similarity degree calculation unit 23 may calculate the similarity degree by another method so long as a value representing the degree of similarity between the two distributions can be calculated. The similarity degree calculation unit 23 may set a parameter having a higher value as the averages of the two distributions become closer to each other to be the similarity degree, for example.

Being high in the similarity degree corresponds to being small in a difference degree; being low in the similarity degree corresponds to being large in the difference degree. Consequently, the similarity degree calculation unit 23 may calculate the difference degree representing the degree of difference between the two distributions in place of the similarity degree. The similarity degree calculation unit 23 may calculate Kullback-Leibler divergence as the difference degree, for example. When the difference degree is calculated in place of the similarity degree, the parts using the similarity degree in the monitoring apparatus 10 execute processing with a value magnitude relation reversed compared with the case in which the similarity degree is processed.

The related sensor identification unit 24 receives the correlation information from the correlation acquisition unit 21 and the target sensor list from the detection unit 22. The related sensor identification unit 24, for the target sensor listed in the target sensor list, detects a sensor for which the intensity of the correlation with the corresponding target sensor is equal to or more than a prescribed value based on the correlation information and identifies the detected sensor as a related sensor. The related sensor identification unit 24 may identify two or more related sensors for one target sensor or does not necessarily identify the related sensor (that is to say, the number of the related sensor is zero).

The related sensor identification unit 24 generates related sensor information indicating the related sensor for the target sensor. The related sensor information, for the target sensor, indicates an identifier (ID) or a name of the corresponding related sensor. The related sensor identification unit 24 may indicate the related sensor for each of the plurality of sensors and generate multi-related information.

The score calculation unit 25 acquires the correlation information from the correlation acquisition unit 21, the target sensor list from the detection unit 22, the similarity degree from the similarity degree calculation unit 23, and the related sensor information from the related sensor identification unit 24. The score calculation unit 25 calculates a score for the target sensor listed in the target sensor list based on the correlation information, the target sensor list, the similarity degree, and the related sensor information.

The score calculation unit 25, for the target sensor, calculates a first score having a larger value as the similarity degree is higher as the score, for example. The score calculation unit 25 sets the first score to be a first value, which is the largest, when the similarity degree is higher than a prescribed threshold and sets the first score to be a second value, which is smaller than the first value, when the similarity degree is the prescribed threshold or less as listed in Table 2, for example. The score calculation unit 25 may calculate the first score based on a more detailed matrix than Table 2, in which the similarity degree for the target sensor is classified into three or more tiers. The score calculation unit 25 may perform calculation based on a prescribed function outputting the first score when the similarity degree for the target sensor is input.

TABLE 2

| Similarity degree for target sensor | First score |
| --- | --- |
| High | Large |
| Low | Small |

A machine learning model like the autoencoder does not change a generation rule of output data with respect to input data during operation. However, a distribution of the input data may be different between during training and during operation. A situation in which the distribution of the input data is different between during training and during operation is called a covariate shift. When the covariate shift does not occur, the machine learning model can predict the output data with high precision. However, when the covariate shift occurs, the machine learning model cannot necessarily predict the output data with high precision.

It is assumed that the first period 201 is a period of the training data of the prediction model. It is assumed that the second period 202 is a period from a certain point in time, which is the future of the first period 201, to the current time. In this case, a situation in which the similarity degree for the target sensor is high means that the covariate shift is not occurring between the first period 201 and the second period 202. Consequently, in this situation, it is expected that the prediction model has high prediction accuracy.

Thus, in the case where the covariate shift is not occurring, when the measured value of the target sensor has deviated from the predicted value near the end of the second period 202, there is a high possibility that a breakdown or deterioration occurred in a device around the target sensor near the end of the second period 202. Consequently, when the measured value of the target sensor has deviated from the predicted value, the large first score represents that there is a high possibility that a breakdown or degradation occurred in the device around the target sensor.

On the contrary, a situation in which the similarity degree for the target sensor is low means that there is a possibility that the covariate shift occurred in the target sensor between the first period 201 and the second period 202. If the covariate shift occurred by maintenance such as device replacement between the first period 201 and the second period 202, the prediction model trained using the training data before the device replacement or the like is considered to have low prediction accuracy.

Thus, in the case where the covariate shift is not occurring, when the measured value of the target sensor has deviated from the predicted value near the end of the second period 202, there is a low possibility that a breakdown or deterioration occurred in the device around the target sensor at a point in time near the end of the second period 202.

Consequently, when the measured value has deviated from the predicted value, the small first score represents that there is a low possibility that a breakdown or deterioration occurred in the device around the target sensor.

The score calculation unit 25 may calculate, as the score for the target sensor, a second score having a value larger as the similarity degree for the target sensor is higher and larger as the similarity degree for the related sensor is higher, for example. The score calculation unit 25, when one related sensor is present for the target sensor, may calculate the second score as listed in Table 3, for example.

TABLE 3

| Similarity degree for target sensor | Similarity degree for related sensor | |
|---|---|---|
| | High | Low |
| High | Large | Medium |
| Low | Medium | Small |

That is to say, as listed in Table 3, the score calculation unit 25 sets the second score to be a first value, which is the largest, when the similarity degree for the target sensor is higher than a prescribed threshold and the similarity degree for the related sensor is higher than a prescribed threshold. The score calculation unit 25 sets the second score to be a second value, which is medium and smaller than the first value, when the similarity degree for the target sensor is higher than the prescribed threshold and the similarity degree for the related sensor is the prescribed threshold or less. The score calculation unit 25 sets the second score to be the second value, which is medium, when the similarity degree for the target sensor is the prescribed threshold or less and the similarity degree for the related sensor is higher than the prescribed threshold. The score calculation unit 25 sets the second score to be a third value, which is smaller than the second value, that is, the smallest, when the similarity degree for the target sensor is the prescribed threshold or less and the similarity degree for the related sensor is the prescribed threshold or less. When there are two or more related sensors for the target sensor, the score calculation unit 25 may calculate the second score based on a more detailed matrix. The score calculation unit 25 may perform calculation based on a prescribed function outputting the second score when the similarity degree for the target sensor and the similarity degree for the related sensor are input.

Many machine learning models including the autoencoder are trained using a correlation of a plurality of elements included in the input data. Consequently, when a difference between the measured value and the predicted value for the first sensor has deviated from a preset set range between the first threshold and the second threshold, for example, there is a possibility that the deviation is caused by a breakdown or deterioration of a device around another sensor strongly related to the first sensor.

It is assumed that the first period 201 is a period of the training data of the prediction model. It is assumed that the second period 202 is a period from a certain point in time, which is the future of the first period 201, to the current time. In this case, it is assumed that a situation in which the similarity degree for the target sensor and the similarity degree for only one related sensor for the target sensor are high has occurred. This situation means that the covariate shift is not occurring between the first period 201 and the second period 202. Consequently, in this situation, it is expected that the prediction model has high prediction accuracy.

Thus, in the case where the covariate shift is not occurring, when the measured value of the target sensor has deviated from the predicted value near the end of the second period 202, there is a high possibility that a breakdown or deterioration occurred in the device around the target sensor at the point in time near the end of the second period 202. Consequently, in the case where the measured value has deviated from the predicted value, a large second score represents that there is a high possibility that a breakdown or deterioration occurred in the device around the target sensor.

On the contrary, a situation in which the similarity degree is low in both the target sensor and the related sensor means that there is a possibility that the covariate shift occurred in both the target sensor and the related sensor between the first period 201 and the second period 202. If the covariate shift occurs by maintenance such as device replacement between the first period 201 and the second period 202, it is considered that the prediction model trained using the training data before the device replacement or the like has low prediction accuracy.

Thus, in the case where the covariate shift is not occurring, when the measured value of the target sensor has deviated from the predicted value near the end of the second period 202, there is a low possibility that a breakdown or deterioration occurred in the device around the target sensor at the point in time near the end of the second period 202. Consequently, when the measured value has deviated from the predicted value, the small second score represents that there is a low possibility that a breakdown or deterioration occurred in the device around the target sensor.

The score calculation unit 25 may calculate the score for each of the plurality of sensors. The score calculation unit 25 may calculate at least either the first score or the second score for each of the plurality of sensors, for example.

In the present embodiment, the image generation unit 15 further receives the target sensor list from the detection unit 22, the similarity degree from the similarity degree calculation unit 23, the related sensor information from the related sensor identification unit 24, and the score (the first score and the second score, for example) of the target sensor from the score calculation unit 25. The image generation unit 15 generates the displayed image including the similarity degree and the score (the first score and the second score) for the target sensors included in the target sensor list.

The image generation unit 15 generates the displayed image including the similarity degree for each of the plurality of sensors, for example. In this case, the displayed image may include the similarity degree for part of the plurality of sensors. The displayed image may include the similarity degree for a sensor to which the user pays attention, for example. The image generation unit 15 may receive information designating the sensor to which attention is paid from the user via a user interface and incorporate the similarity degree for the received sensor into the displayed image, for example. The monitoring apparatus 10 displays the displayed image including the similarity degree and can thereby support determination about whether the covariate shift has occurred for the sensor by the user.

The image generation unit 15 may generate the displayed image including the score (the first score and the second score, for example) for each of the plurality of sensors, for example. In this case, the displayed image may include the score for part of the plurality of sensors. The displayed image may include the score for a sensor to which the user pays attention, for example. The monitoring apparatus 10 displays the displayed image including the score and can thereby support determination about whether the covariate shift has occurred for the sensor and the related sensor by the user.

The image generation unit 15, for each of the plurality of sensors, acquires information indicating whether related maintenance is performed, a time at which the related maintenance is performed, and the contents of the related maintenance from the external apparatus, for example. The image generation unit 15 then, for the target sensor and a sensor for which the similarity degree is lower than a prescribed value, may generate the displayed image including at least one of the information indicating whether related maintenance is performed, the time at which the related maintenance is performed, and the contents of the related maintenance. The related maintenance includes replacement or repair of a device around the corresponding sensor and work switching of an operation mode for inspection, replacement, or repair to switch a redundant device around the corresponding sensor.

Even when the cause of the covariate shift cannot be identified by the similarity degree alone, the user may be able to presume the cause of the covariate shift by referring to maintenance information. When there is no maintenance related to the sensor for which the similarity degree is lower than the prescribed value, for example, the user can determine that the cause of the covariate shift is not the maintenance. Based on the time of the maintenance related to the sensor for which the similarity degree is lower than the prescribed value and the contents of the maintenance, the user can determine that the cause of the covariate shift is the maintenance. Consequently, the monitoring apparatus 10 displays the displayed image including the information on the maintenance for the sensor for which the similarity degree is lower than the prescribed value and can thereby support determination about the cause of the covariate shift by the user.

The image generation unit 15, for the target sensor for which the score (the first score or the second score) is lower than a prescribed value among the one or more target sensors included in the target sensor list, may generate the displayed image including at least one of information indicating whether related maintenance is performed, a time at which the related maintenance is performed, and the contents of the related maintenance. Further, the image generation unit 15, for the related sensor of the sensor for which the score is lower than the prescribed value, may generate the displayed image including at least one of the information indicating whether related maintenance is performed, the time at which the related maintenance is performed, and the contents of the related maintenance.

When the maintenance related to the target sensor is absent, the user can determine that the target sensor is detected by a breakdown or deterioration of the device therearound. When the maintenance related to the target sensor is present, the user can determine that the target sensor is not necessarily detected by a breakdown or deterioration of the device therearound and that there is a possibility that it is detected due to the maintenance. Consequently, the monitoring apparatus 10 displays the displayed image including the information on the maintenance for the target sensor and the related sensor for which the score is lower than the prescribed value and can thereby support determination about the cause of the deviation between the measured value and the predicted value by the user.

Figure 14:
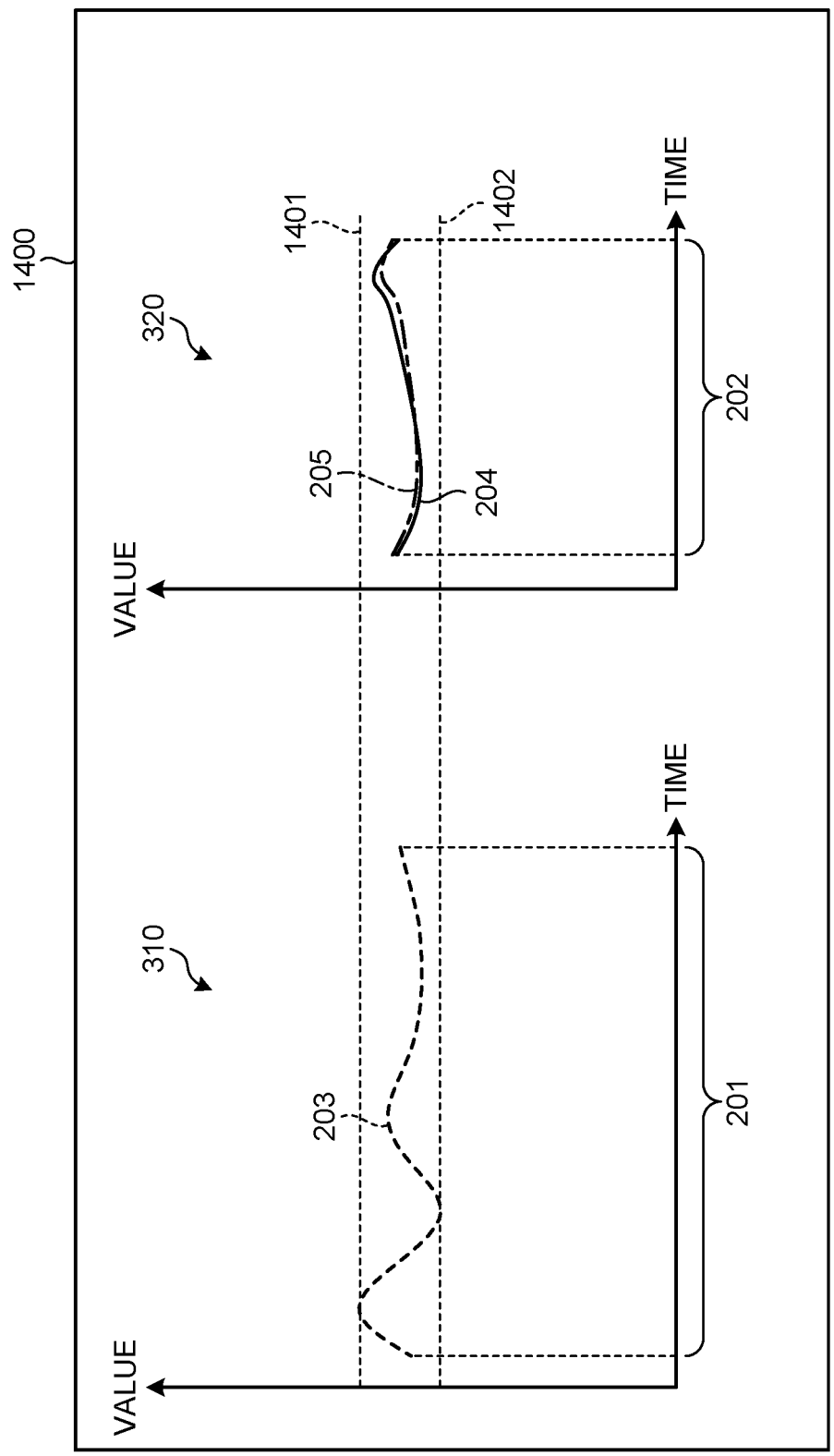
FIG. 14 is a diagram of a 12th displayed image.

FIG. 14 is a diagram of a 12th displayed image 1400. The monitoring apparatus 10 may display the displayed image including the 12th displayed image 1400 illustrated in FIG. 14, for example.

The 12th displayed image 1400 includes the first past value graph 203, the first measured value graph 204, the first predicted value graph 205, a maximum value line 1401, and a minimum value straight line 1402. The monitoring apparatus 10 draws the first past value graph 203 in the second drawing area 310 and draws the first measured value graph 204 and the first predicted value graph 205 in the third drawing area 320.

The maximum value line 1401 is a straight line representing the maximum value of the first past value graph 203. The minimum value straight line 1402 is a straight line representing the minimum value of the first past value graph 203.

The monitoring apparatus 10 draws the maximum value line 1401 and the minimum value straight line 1402 across the second drawing area 310 and the third drawing area 320. That is to say, the maximum value line 1401 and the minimum value straight line 1402 are displayed so as to be superimposed on the first past value graph 203 and the first measured value graph 204. Further, in the first measured value graph 204, the color of the time at which the measured value is larger than the maximum value indicated by the maximum value line 1401 or the measured value is smaller than the minimum value indicated by the minimum value straight line 1402 is made different from the color of the other times.

The range between the maximum value line 1401 and the minimum value straight line 1402 represent a value range of the measured value of the corresponding sensor in the first period 201. When the time-series measured data in the first period 201 is used for the training of the prediction model, the range between the maximum value line 1401 and the minimum value straight line 1402 represents a value range of the measured value of the corresponding sensor in the training data.

Consequently, when the value of the first measured value graph 204 has exceeded the range between the maximum value line 1401 and the minimum value straight line 1402, the user can realize that the measured value has left the range of the value range in the training data. The monitoring apparatus 10 may display part exceeding the range between the maximum value line 1401 and the minimum value straight line 1402 in the first measured value graph 204 with a color different from that of the other part. The monitoring apparatus 10 displays such a 12th displayed image 1400 and thereby enables the user to easily realize that the measured value has left the range of the value range in the training data. The maximum value line 1401 may be changed to a straight line representing a value obtained by adding a prescribed value to the maximum value of the first past value graph 203. The minimum value straight line 1402 may be changed to a straight line representing a value obtained by subtracting a prescribed value from the minimum value of the first past value graph 203. When these changes are performed, the user is enabled to easily realize that the measured value has left a range wider than the value range in the training data.

Figure 15:
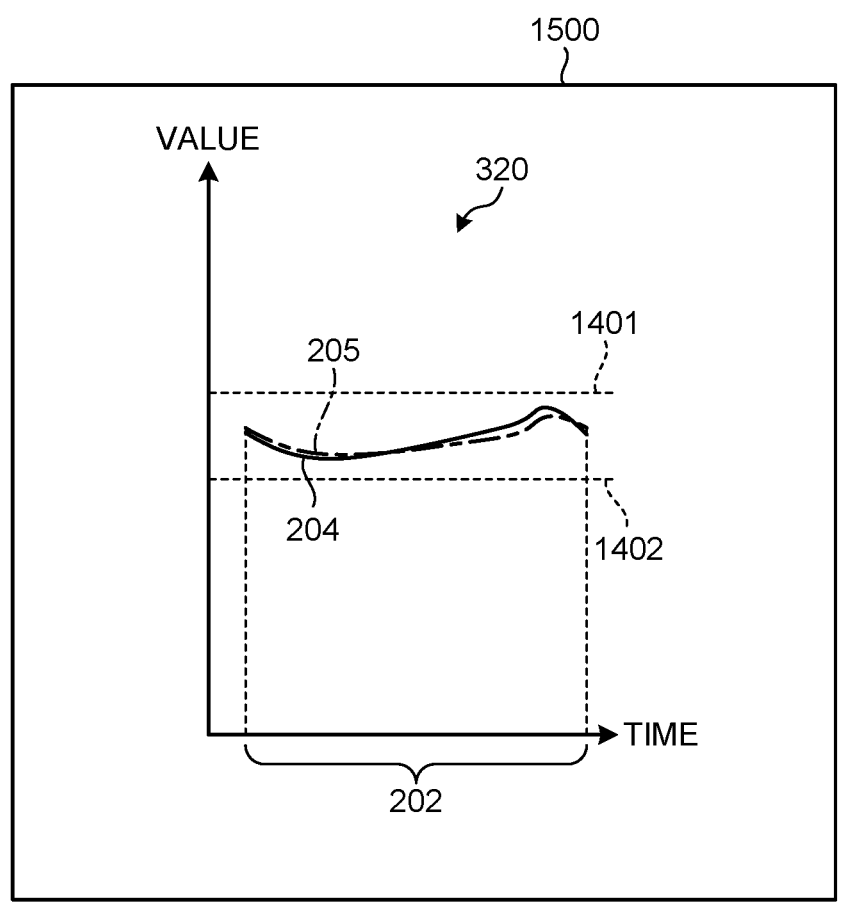
FIG. 15 is a diagram of a 13th displayed image.

FIG. 15 is a diagram of a 13th displayed image 1500. The monitoring apparatus 10 may display the 13th displayed image 1500 illustrated in FIG. 15, for example.

The 13th displayed image 1500 does not include the second drawing area 310 and includes only the third drawing area 320 compared with the 12th displayed image 1400 illustrated in FIG. 14. The monitoring apparatus 10 enables the user to easily realize that the measured value has left the range of the value range in the training data also by displaying such a 13th displayed image 1500.

Effects of Second Embodiment

As in the foregoing, the monitoring apparatus 10 according to the present embodiment, like the first embodiment, can present the information to determine whether the deviation between the measured data and the predicted data output from the plurality of sensors installed in the system to be monitored is caused by the system being not in a sound condition to the user. Further, the monitoring apparatus 10 displays the similarity degree, the score, or the like and can thus support determination about the cause of the deviation between the measured value and the predicted value and a cause of a breakdown by the user. Thus, the monitoring apparatus 10 according to the present embodiment can improve usability.

First Modification

Figure 16:
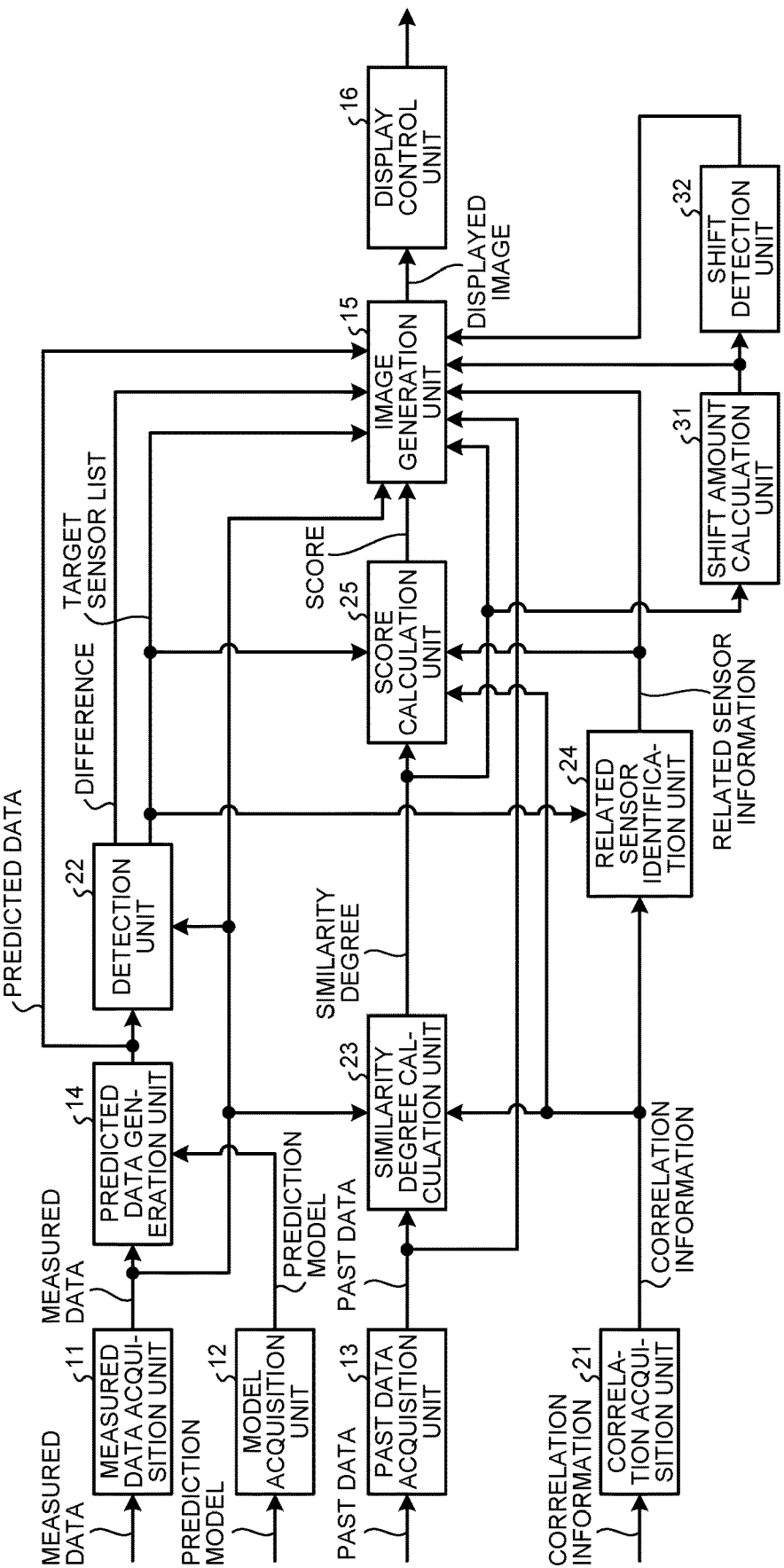
FIG. 16 is a diagram of a configuration of the monitoring apparatus according to a first modification of the second embodiment.

FIG. 16 is a diagram of a configuration of the monitoring apparatus 10 according to a first modification of the second embodiment. The monitoring apparatus 10 according to the first modification further includes a shift amount calculation unit 31 and a shift detection unit 32.

The shift amount calculation unit 31 receives the similarity degree from the similarity degree calculation unit 23. When the similarity degree calculation unit 23 calculates the difference degree, which has a smaller value as the similarity degree is higher, the shift amount calculation unit 31 receives the difference degree from the similarity degree calculation unit 23.

The shift amount calculation unit 31 calculates a total number of sensors for which the similarity degrees are lower than a preset third threshold among the plurality of sensors as a shift amount. Alternatively, the shift amount calculation unit 31 calculates a total of the difference degree, with the magnitude relation of the similarity degree for the plurality of sensors reversed, as the shift amount. When receiving the difference degree from the similarity degree calculation unit 23, the shift amount calculation unit 31 calculates a total number of sensors for which the similarity degrees, with the magnitude relation of the difference degrees reversed, are lower than the preset third threshold among the plurality of sensors as the shift amount. Alternatively, the shift amount calculation unit 31 calculates a total of the difference degree for the plurality of sensors as the shift amount.

The shift detection unit 32 receives the shift amount form the shift amount calculation unit 31. The shift detection unit 32 detects that the shift amount is larger than a preset fourth threshold. The shift detection unit 32, when the shift amount is larger than the fourth threshold, outputs information indicating that the shift amount is larger than the fourth threshold.

The image generation unit 15 further receives the shift amount from the shift amount calculation unit 31 and the information indicating that the shift amount is larger than the fourth threshold from the shift detection unit 32. The image generation unit 15 then generates the displayed image further including the shift amount. The image generation unit 15, when the shift amount is larger than the fourth threshold, generates the displayed image further including the information indicating that the shift amount is larger than the fourth threshold.

It is assumed that the first period 201 is a period of the training data of the prediction model, for example. In this case, a large total number of sensors for which the similarity degrees are lower than the third threshold means that the covariate shift is occurring in a large number of sensors. In addition, a small total number of sensors for which the similarity degrees are lower than the third threshold means that the covariate shift is occurring in a small number of sensors. Similarly, a large total of the difference degrees for the plurality of sensors means that the possibility is high that the covariate shift is occurring across the plurality of sensors as a whole. In addition, a small total of the difference degrees for the plurality of sensors means that the possibility is low that the covariate shift is occurring across the plurality of sensors as a whole.

Consequently, based on the shift amount and the information indicating that the shift amount is larger than the fourth threshold, the user can realize that there is a possibility that the prediction model has deteriorated with the lapse of time. Consequently, the monitoring apparatus 10 of the first modification displays the shift amount and the information indicating that the shift amount is larger than the fourth threshold and can thereby support consideration of a time at which the prediction model is retrained by the user. The shift amount calculation unit 31 and the shift detection unit 32 may be provided in an external information processing apparatus outside the monitoring apparatus 10, and a monitor of the external information processing apparatus may display the shift amount and the information indicating that the shift amount is larger than the fourth threshold.

Second Modification

Figure 17:
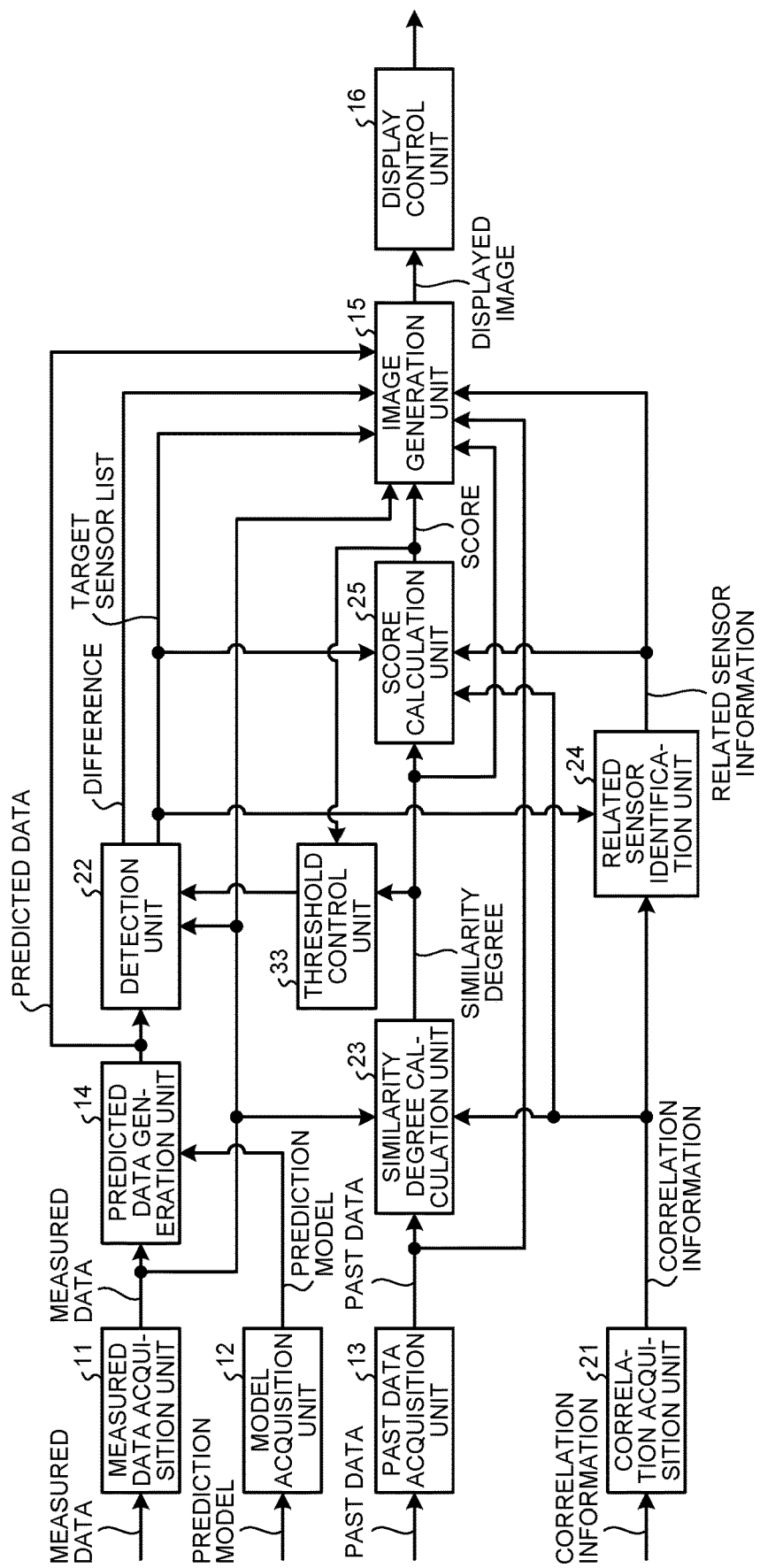
FIG. 17 is a diagram of a configuration of the monitoring apparatus according to a second modification of the second embodiment.

FIG. 17 is a diagram of a configuration of the monitoring apparatus 10 according to a second modification of the second embodiment. The monitoring apparatus 10 according to the second modification further includes a threshold control unit 33.

The threshold control unit 33 receives the similarity degree from the similarity degree calculation unit 23 and the score (the first score or the second score) from the score calculation unit 25. The threshold control unit 33 adaptively controls the first threshold and the second threshold for use in determination of the magnitude of the difference between the measured value and the predicted value by the detection unit 22. More specifically, the threshold control unit 33 performs control to make the first threshold larger and to make the second threshold smaller as any one of the similarity degree, the first score, and the second score is smaller.

When the cause of the deviation between the measured value and the predicted value is maintenance, for example, it is considered that there is often no need to detect a sensor related to maintenance as the target sensor. The threshold control unit 33 can reduce the frequency of detecting the corresponding sensor as the target sensor, when the cause of the deviation between the measured value and the predicted value is maintenance. Consequently, the monitoring apparatus 10 of the second modification can reduce the number of times the user determines the cause of the deviation between the measured value and the predicted value and thus reduce work by the user.

Third Modification

Figure 18:
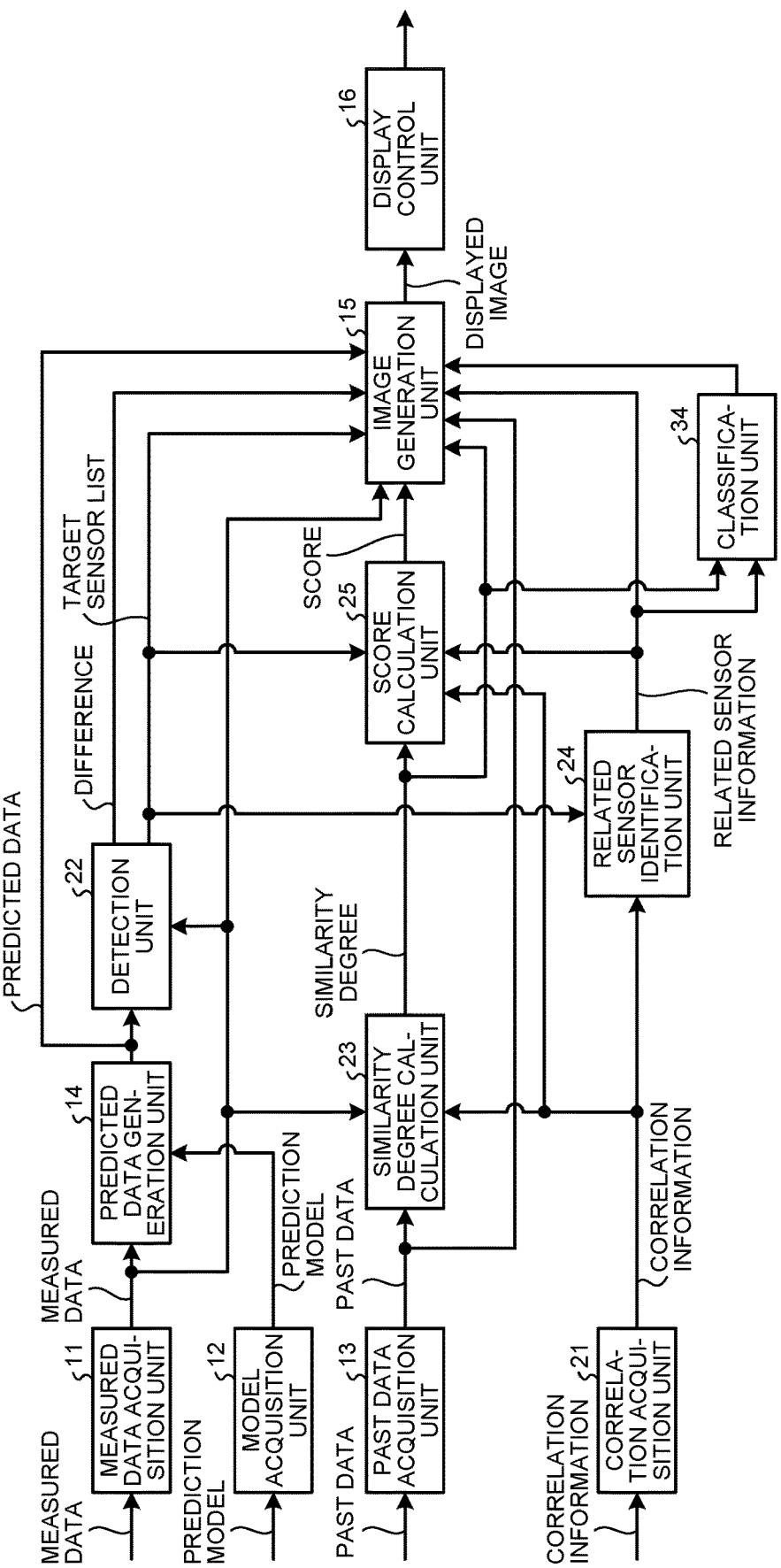
FIG. 18 is a diagram of a configuration of the monitoring apparatus according to a third modification of the second embodiment.

FIG. 18 is a diagram of a configuration of the monitoring apparatus 10 according to a third modification of the second embodiment. The monitoring apparatus 10 according to the third modification further includes a classification unit 34.

The classification unit 34 receives the similarity degree from the similarity degree calculation unit 23 and the related sensor information from the related sensor identification unit 24. The classification unit 34 classifies each of the plurality of sensors into at least four states based on the magnitude of the similarity degree and the magnitude of the similarity degree for the related sensor.

The classification unit 34 may classify each of the plurality of sensors into four states as listed in Table 4, for example.

TABLE 4

| Similarity degree for detecting sensor | Similarity degree for related sensor | |
| --- | --- | --- |
| | High | Low |
| High | First state | Second state |
| Low | Third state | Fourth state |

That is to say, the classification unit 34, for each of the plurality of sensors, defines a case in which the similarity degree is higher than a preset prescribed value and the average of the similarity degrees for the related sensors is higher than a prescribed value as a first state. The classification unit 34, for each of the plurality of sensors, defines a case in which the similarity degree is higher than the prescribed value and the average of the similarity degrees for the related sensors is the prescribed value or less as a second state. The classification unit 34, for each of the plurality of sensors, defines a case in which the similarity degree is the prescribed value or less and the average of the similarity degrees for the related sensors is higher than the prescribed value as a third state. The classification unit 34, for each of the plurality of sensors, defines a case in which the similarity degree is the prescribed value or less and the average of the similarity degrees for the related sensors is the prescribed value or less as a fourth state.

The classification unit 34 may classify each of the plurality of sensors in more detail in accordance with the similarity degree.

The image generation unit 15 may make a part larger than the first threshold or a part lower than the second threshold in the measured value graph for the target sensor a color different for each classification result. The image generation unit 15, also for the predicted value graph and the difference graph for the target sensor, may make a part larger than the first threshold or a part lower than the second threshold a color different for each classification result.

The color of the measured value graph represents the degree of a possibility that the cause of the deviation between the measured value and the predicted value is a breakdown. Consequently, the monitoring apparatus 10 according to the third modification changes the color of the measured value graph as described above and thereby enables the user to easily determine whether the cause of the deviation between the measured value and the predicted value is a breakdown.

The image generation unit 15 may generate a layout image representing a layout of the devices and the sensors in the system. The display control unit 16 causes the monitor to display the layout image generated by the image generation unit 15.

In this case, the image generation unit 15 changes information representing each of the plurality of sensors (an identifier (ID), a name, and an icon, for example) displayed on the layout image in accordance with the state into which classification is made by the classification unit 34. The image generation unit 15 changes the color of the information representing each of the plurality of sensors in accordance with the state into which the classification is made, for example.

The color of the sensor included in the layout image represents the degree of a possibility that the cause of the deviation between the measured value and the predicted value is a breakdown. Consequently, the monitoring apparatus 10 according to the third modification displays such as layout image and thereby enables the user to easily check sensors indicating a high probability that the cause of the deviation between the measured value and the predicted value is a breakdown. Consequently, the user can easily determine that there is a high probability that a broken-down device is present around an area in which the sensors indicating a high probability that the cause of the deviation between the measured value and the predicted value is a breakdown are concentrated.

The image generation unit 15 may generate the displayed image further including the target sensor list received from the detection unit 22. In this case, the image generation unit 15 changes the color of identification information of each of the one or more target sensors included in the target sensor list in accordance with the state into which the classification is made. The monitoring apparatus 10 according to the third modification displays such a target sensor list and thereby enables the user to easily determine the sensors indicating a high probability that the cause of the deviation between the measured value and the predicted value is a breakdown.

Fourth Modification

Figure 19:
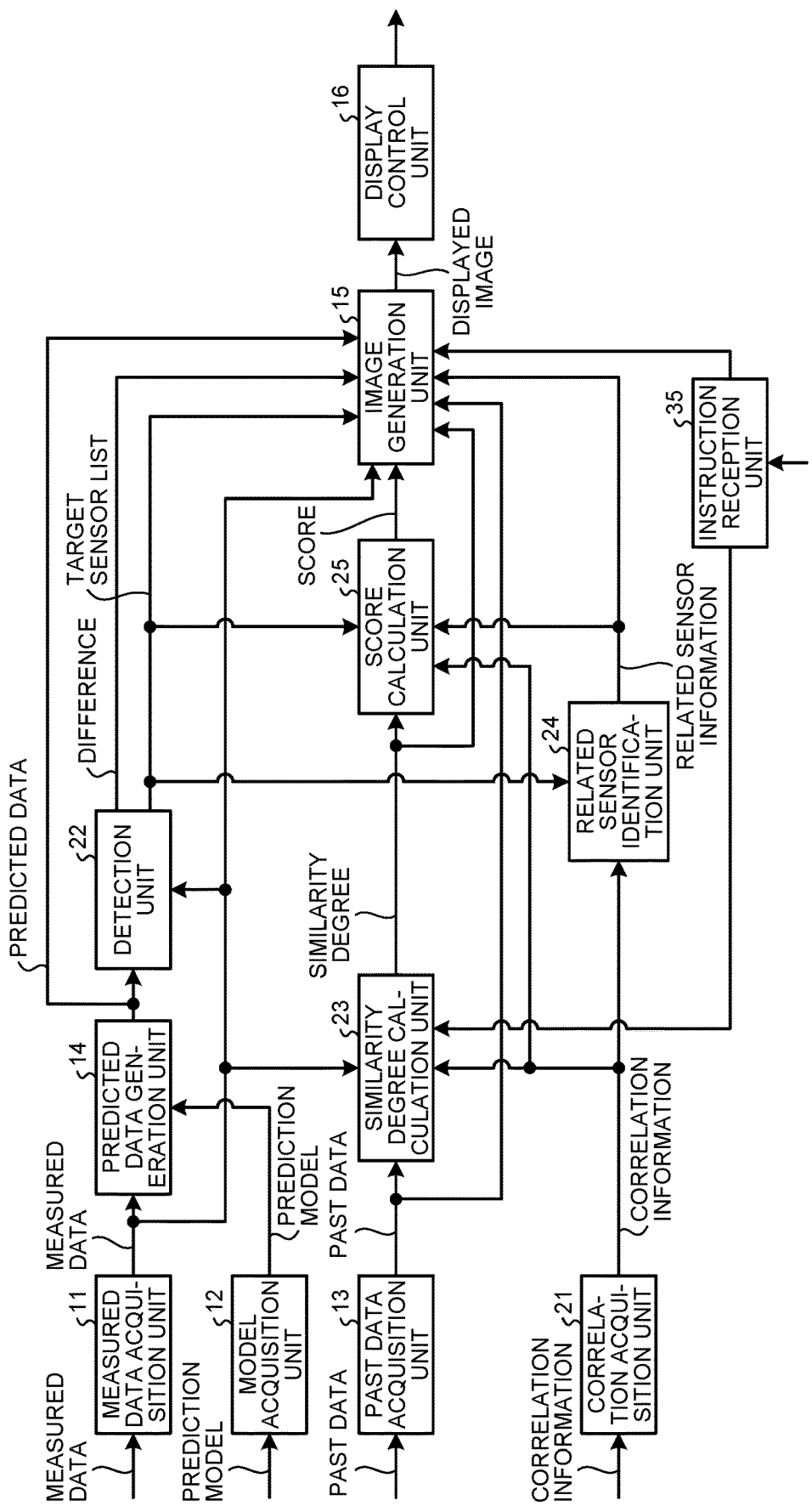
FIG. 19 is a diagram of a configuration of the monitoring apparatus according to a fourth modification of the second embodiment.

FIG. 19 is a diagram of a configuration of the monitoring apparatus 10 according to a fourth modification of the second embodiment. The monitoring apparatus 10 according to the fourth modification further includes an instruction reception unit 35.

The instruction reception unit 35 receives an instruction to change at least one of a starting time of the first period 201, an ending time of the first period 201, a staring time of the second period 202, and an ending time of the second period 202 by the user.

The instruction reception unit 35 receives an instruction to select any of the starting time of the first period 201, the ending time of the first period 201, the staring time of the second period 202, and the ending time of the second period 202 and further receives an instruction to slide the selected time in the time direction, for example. The instruction reception unit 35 receives an operation with a mouse to a slider included in the displayed image to change the positions of the first period 201 and the second period 202 included in the displayed image, for example. The instruction reception unit 35, for an operation to change the ending time of the first period 201 or the ending time of the second period 202, may receive an operation to a reproduction button included in the displayed image, for example. Through such operations, the user can change the first period 201 and the second period 202.

The instruction reception unit 35, in response to the instruction by the user, changes at least one of the starting time of the first period 201, the ending time of the first period 201, the staring time of the second period 202, and the ending time of the second period 202.

The similarity degree calculation unit 23 receives the starting time of the first period 201, the ending time of the first period 201, the staring time of the second period 202, and the ending time of the second period 202 after being changed from the instruction reception unit 35. The similarity degree calculation unit 23 then again calculates the similarity degree for each of the plurality of sensors based on the time-series measured data in the first period 201 after being changed and the time-series past data in the second period 202 after being changed.

The score calculation unit 25 acquires the similarity degree after being changed from the similarity degree calculation unit 23. The score calculation unit 25 then again calculates the score for the target sensor or each of the plurality of sensors based on the similarity degree after being changed.

The image generation unit 15 receives the starting time of the first period 201, the ending time of the first period 201, the staring time of the second period 202, and the ending time of the second period 202 after being changed from the instruction reception unit 35. The image generation unit 15 then again generates the past value graph, the measured value graph, and the predicted value graph and incorporates them into the displayed image. The image generation unit 15 may change the position of information indicating a time range of the measured value used to calculate the similarity degree without changing the display of the past value graph, the measured value graph, and the predicted value graph. Further, the image generation unit 15 incorporates the similarity degree after being changed and the score after being changed into the displayed image.

Thus, the starting time of the first period 201, the ending time of the first period 201, the staring time of the second period 202, and the ending time of the second period 202 are changed, whereby the monitoring apparatus 10 enables the user to determine at what time the deviation between the measured value and the predicted value or the covariate shift occurred. Thus, the user can easily identify the cause of the occurrence of the deviation between the measured value and the predicted value or the covariate shift.

Third Embodiment

The following describes a monitoring system 40 according to a third embodiment.

Figure 20:
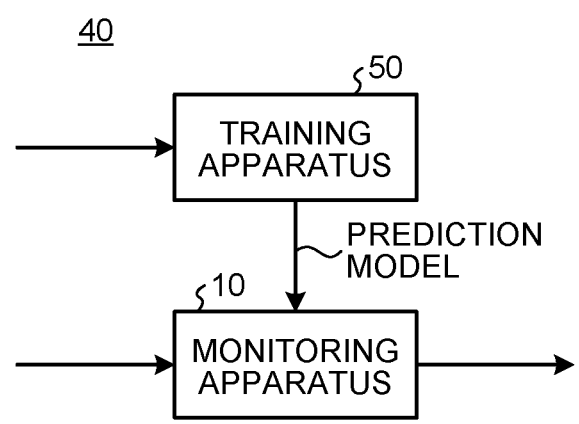
FIG. 20 is a diagram of a configuration of a monitoring system according to a third embodiment.

FIG. 20 is a diagram of a configuration of the monitoring system 40 according to the third embodiment. The monitoring system 40 includes the monitoring apparatus 10 and a training apparatus 50.

The training apparatus 50 trains the prediction model to be used by the monitoring apparatus 10 based on the time-series measured data including the measured values output from the plurality of sensors installed in the system to be monitored by the monitoring apparatus 10.

The monitoring apparatus 10 has the same configuration as that described in the first embodiment or the second embodiment. The monitoring apparatus 10 receives the prediction model trained by the training apparatus 50. The monitoring apparatus 10 operates based on the prediction model generated by the training apparatus 50.

The training apparatus 50 may be installed near an installation place of the monitoring apparatus 10 or provided at a remote place separate from the installation place of the monitoring apparatus 10. The monitoring apparatus 10 and the training apparatus 50 are connected to each other with a network. Alternatively, the prediction model generated by the training apparatus 50 is sent to the monitoring apparatus 10 via a removable medium to cause them to be connected to each other.

Figure 21:
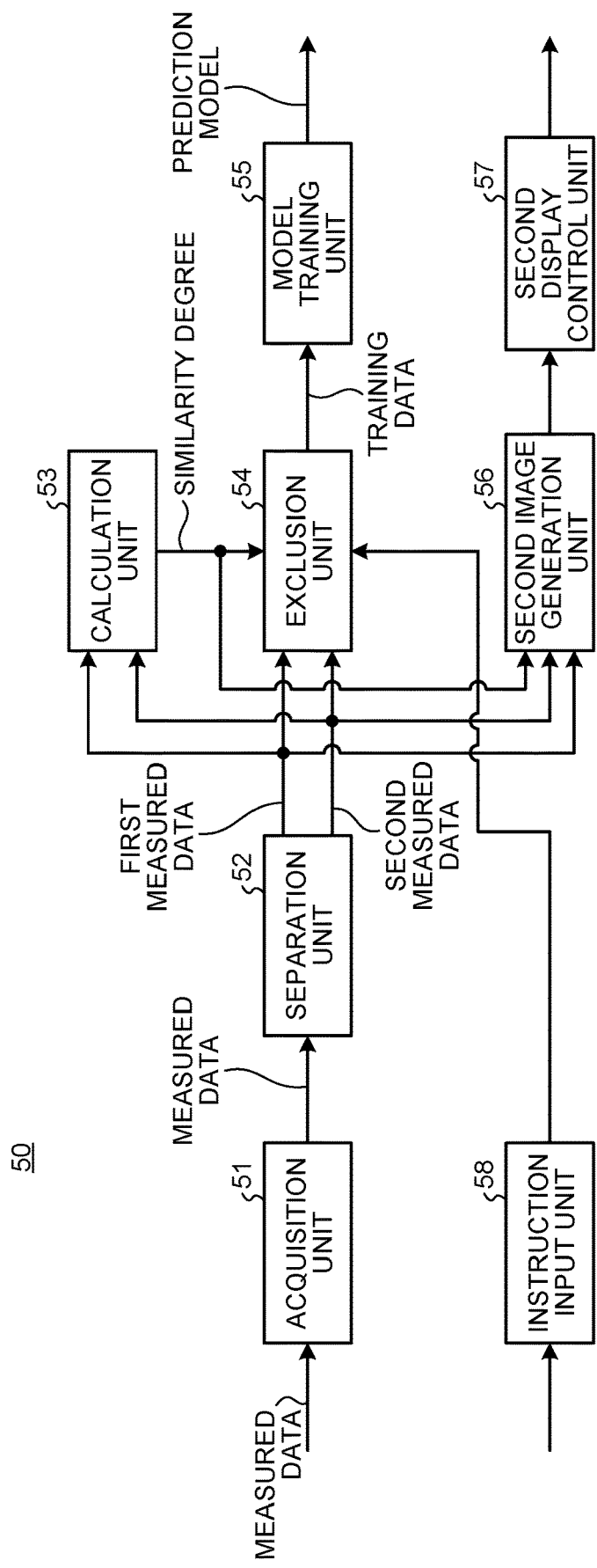
FIG. 21 is a diagram of a configuration of a model training apparatus.

FIG. 21 is a diagram of a configuration of the training apparatus 50 according to the third embodiment. The training apparatus 50 includes an acquisition unit 51, a separation unit 52, a calculation unit 53, an exclusion unit 54, a model training unit 55, a second image generation unit 56, a second display control unit 57, and an instruction input unit 58.

The acquisition unit 51 acquires the time-series measured data including the measured values output from the plurality of sensors installed in the system.

The separation unit 52 receives the time-series measured data from the acquisition unit 51. The separation unit 52 separates the time-series measured data into first measured data in a first training period and second measured data in a second training period after the first training period. A blank period may be included between the first training period and the second training period.

The calculation unit 53 receives the time-series first measured data in the first training period and the time-series second measured data in the second training period from the separation unit 52. The calculation unit 53, for each of the plurality of sensors, calculates a similarity degree between a distribution of the corresponding measured value included in the first measured data in the first training period and a distribution of the corresponding measured value included in the second measured data in the second training period.

The calculation unit 53, for the first sensor among the plurality of sensors, calculates the area of an overlapping area between a histogram of the corresponding measured value included in the first measured data in the first training period and a histogram of the corresponding measured value included in the second measured data in the second training period (the histogram intersection) as the similarity degree, for example. The similarity degree may be a normalized value obtained by dividing the histogram intersection by the area of the histogram of the first measured data or the area of the histogram of the second measured data.

The calculation unit 53, for the first sensor among the plurality of sensors, may calculate the area of an overlapping area between a discrete probability distribution of the corresponding measured value included in the first measured data in the first training period and a discrete probability distribution of the corresponding measured value included in the second measured data in the second training period as the similarity degree, for example. The calculation unit 53 may calculate the similarity degree by another method so long as a value representing the degree of similarity between the two distributions can be calculated. The calculation unit 53 may set a parameter having a larger value as the averages of the two distributions become closer to each other to be the similarity degree, for example.

A high similarity degree corresponds to a small difference degree; a low similarity degree corresponds to a large difference degree. Consequently, the calculation unit 53 may calculate the difference degree representing the degree of difference between the two distributions as the similarity degree. The calculation unit 53 may calculate Kullback-Leibler divergence as the difference degree, for example. When the calculation unit 53 calculates the difference degree in place of the similarity degree, the parts using the similarity degree in the training apparatus 50 execute processing with a value magnitude relation reversed compared with the case in which the similarity degree is processed.

The exclusion unit 54 receives the first measured data in the first training period and the second measured data in the second training period from the separation unit 52. The exclusion unit 54 may receive the time-series measured data from the acquisition unit 51.

Further, the exclusion unit 54 acquires the similarity degree for each of the plurality of sensors from the calculation unit 53. The exclusion unit 54 excludes the measured value corresponding to at least one sensor for which the similarity degree is lower than a preset value among the measured values included in the received time-series measured data to generate training data.

The exclusion unit 54 may exclude the measured value corresponding to all sensors for which the similarity degrees are lower than the preset value from the time-series measured data, for example. The exclusion unit 54 may exclude the measured value corresponding to a part of sensors among all the sensors for which the similarity degrees are lower than the preset value from the time-series measured data.

The model training unit 55 receives the training data from the exclusion unit 54. The model training unit 55 then refers to the training data to train the prediction model. The prediction model is the autoencoder, for example. When the prediction model is the autoencoder, the model training unit 55 trains the prediction model using a correlation among the plurality of sensors as described in the first embodiment. The prediction model is not limited to the autoencoder and may be another model using any machine learning system.

The second image generation unit 56 receives the first measured data in the first training period and the second measured data in the second training period from the separation unit 52. The second image generation unit 56 generates the displayed image including a graph representing temporal change in the measured value included in the time-series first measured data in the first training period and a graph representing temporal change in the measured value included in the time-series second measured data in the second training period for each of the plurality of sensors. Further, the second image generation unit 56 may incorporate a graph representing a distribution of the measured value included in the time-series first measured data in the first training period and a graph representing a distribution of the measured value included in the time-series second measured data in the second training period into the displayed image for each of the plurality of sensors. Further, the second image generation unit 56 may receive the similarity degree calculated by the calculation unit 53 and incorporate it into the displayed image.

The second display control unit 57 receives the displayed image generated by the second image generation unit 56. The second display control unit 57 causes the monitor to display the received displayed image.

The instruction input unit 58 receives designation of a sensor for which the measured value is not excluded from the measured data among all the sensors for which the similarity degrees are lower than the preset value from the user. When the instruction input unit 58 receives the designation of the sensor for which the measured value is not excluded from the measured data, the exclusion unit 54, even for the sensor for which the similarity degree is lower than the preset value, generates the training data without excluding the measured value corresponding to the designated sensor from the measured data.

The second display control unit 57, for the sensor for which the similarity degree is lower than the preset value, may generate the displayed image including at least one of information indicating whether related maintenance is performed, a time at which the related maintenance is performed, and the contents of the related maintenance. Thus, the training apparatus 50 can support determination about whether the measured value of the sensor for which the similarity degree is lower than the preset value is excluded from the training data by the user. The user examines a cause of the similarity degree being lower than the preset value and can thus exclude the measured value of the sensor for which the similarity degree is lower than the preset value from the training data, for example. The measured value excluded from the training data is not to be monitored by the monitoring apparatus 10 using the prediction model. Designation of the sensor for which the measured value is not excluded can be performed via the instruction input unit 58, whereby the user can determine the measured value to be excluded from the training data and generate the prediction model.

Figure 22:
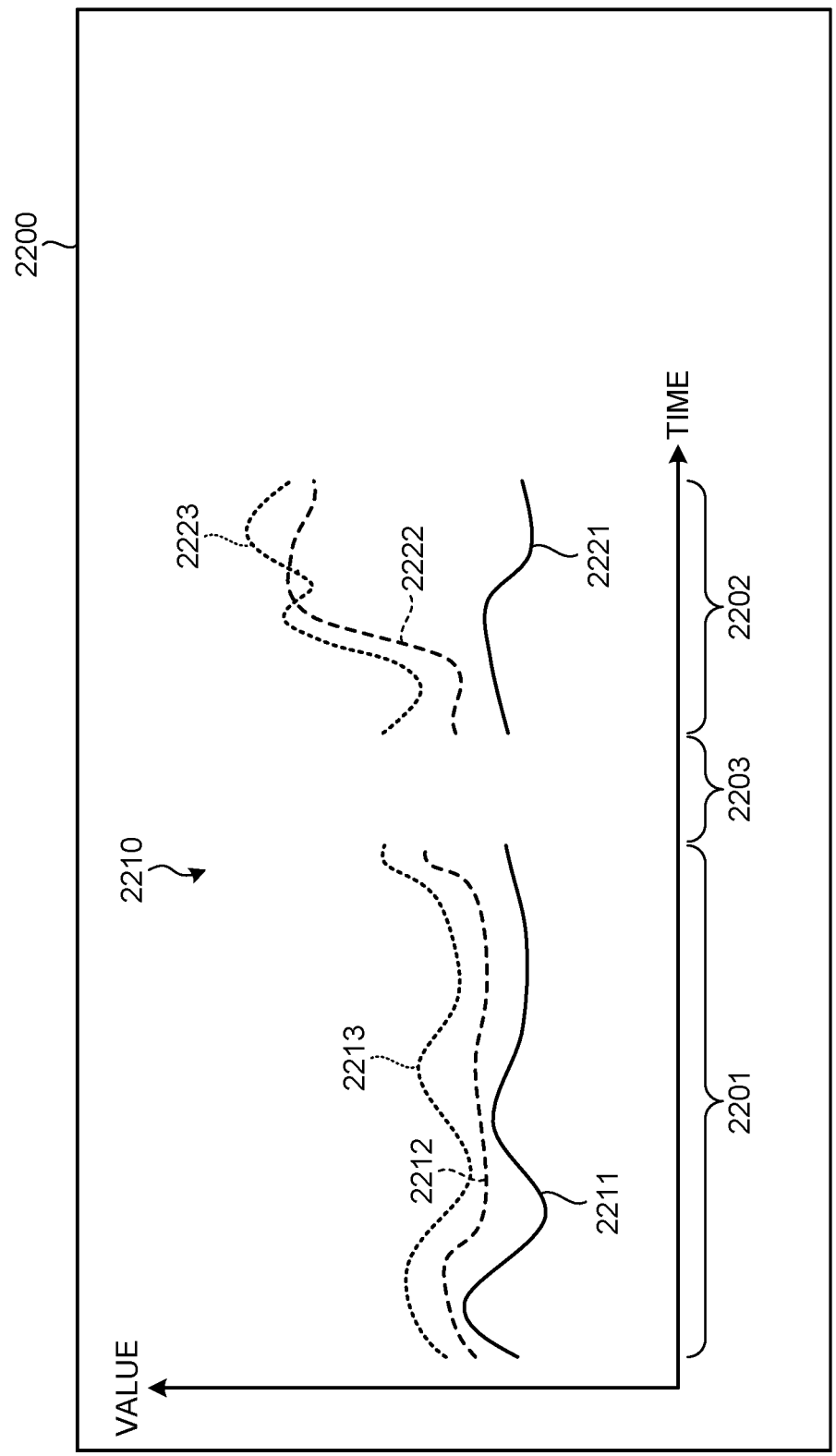
FIG. 22 is a diagram of a 14th displayed image.

FIG. 22 is a diagram of a 14th displayed image 2200. The training apparatus 50 displays the 14th displayed image 2200 illustrated in FIG. 22, for example.

The 14th displayed image 2200 includes a first graph 2211, a second graph 2212, a third graph 2213, a fourth graph 2221, a fifth graph 2222, and a sixth graph 2223. Each of the first graph 2211, the second graph 2212, and the third graph 2213 represents temporal change in any measured value included in the first measured data in a first training period 2201. The fourth graph 2221, the fifth graph 2222, and the sixth graph 2223 each represent temporal change in any measured value included in the time-series second measured data in a second training period 2202.

The 14th displayed image 2200 includes a sixth drawing area 2210. In the sixth drawing area 2210, the horizontal axis represents a time axis, whereas the vertical axis represents the value. The training apparatus 50 draws the first graph 2211, the second graph 2212, the third graph 2213, the fourth graph 2221, the fifth graph 2222, and the sixth graph 2223 in the 14th displayed image 2200.

The second training period 2202 is after the first training period 2201. An intermediate period 2203 between the first training period 2201 and the second training period 2202 is a period of maintenance, for example.

Figure 23:
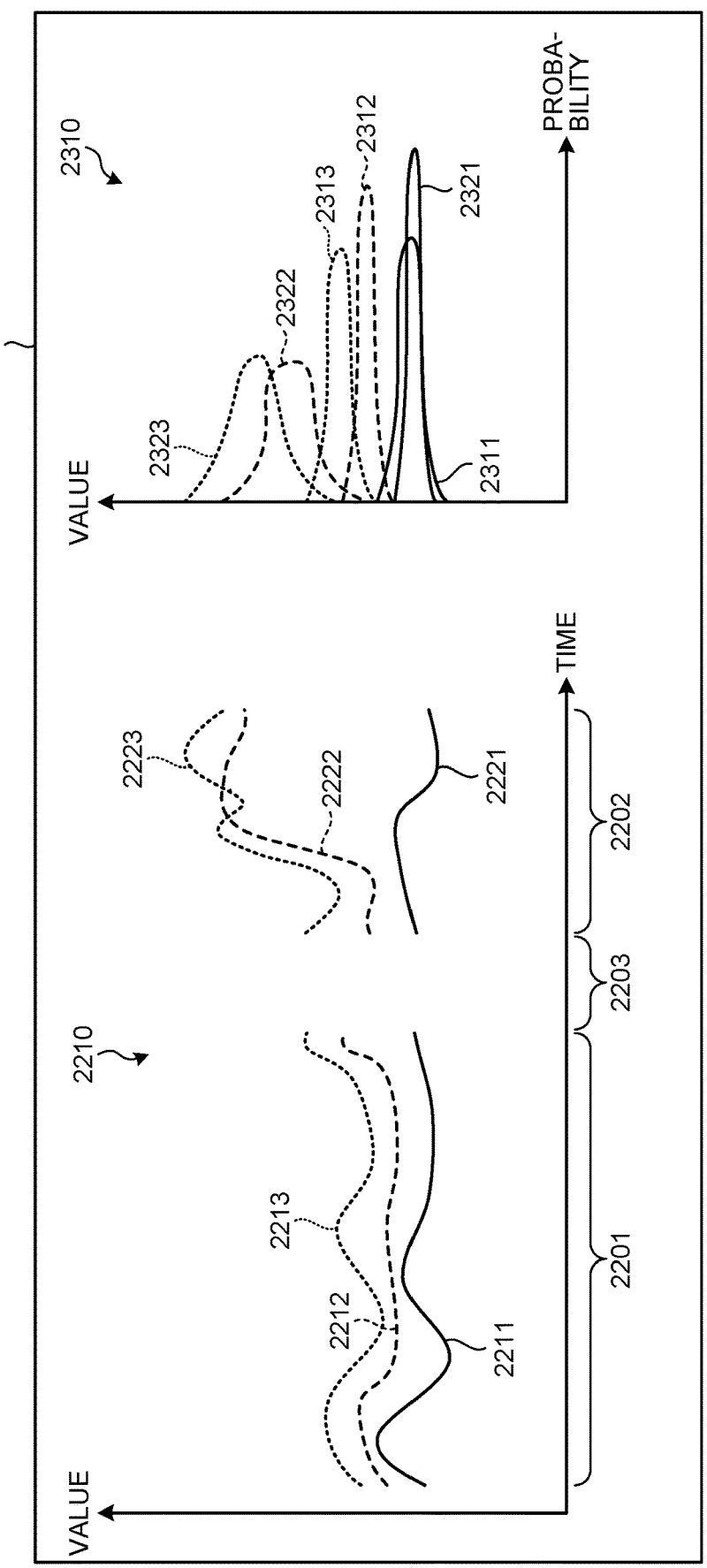
FIG. 23 is a diagram of a 15th displayed image.

FIG. 23 is a diagram of a 15th displayed image 2300. The training apparatus 50 may display the 15th displayed image 2300 illustrated in FIG. 23, for example.

The 15th displayed image 2300 includes a first distribution graph 2311, a second distribution graph 2312, a third distribution graph 2313, a fourth distribution graph 2321, a fifth distribution graph 2322, and a sixth distribution graph 2323 in addition to the graphs illustrated in FIG. 22.

The first distribution graph 2311 represents a discrete probability distribution of the first graph 2211. The second distribution graph 2312 represents a discrete probability distribution of the second graph 2212. The third distribution graph 2313 represents a discrete probability distribution of the third graph 2213.

The fourth distribution graph 2321 represents a discrete probability distribution of the fourth graph 2221. The fifth distribution graph 2322 represents a discrete probability distribution of the fifth graph 2222. The sixth distribution graph 2323 represents a discrete probability distribution of the sixth graph 2223.

The 15th displayed image 2300 includes the sixth drawing area 2210 and a seventh drawing area 2310, in which the horizontal axis represents the probability, whereas the vertical axis represents the value. The training apparatus 50 draws the distribution graphs in the seventh drawing area 2310.

The user refers to the 15th displayed image 2300 in FIG. 23 and can thereby easily determine a difference between a distribution of the measured value in the first training period 2201 and a distribution of the measured value in the second training period 2202 in shape and average for each of the plurality of sensors.

By referring to the 15th displayed image 2300 in FIG. 23, the user can determine that the first distribution graph 2311 and the fourth distribution graph 2321, which are the distributions of the measured value of the same sensor, are substantially the same in shape and average, for example.

By referring to the 15th displayed image 2300 in FIG. 23, the user can determine that the second distribution graph 2312 and the fifth distribution graph 2322, which are the distributions of the measured value of the same sensor, are different from each other in shape and average, for example. By referring to the 15th displayed image 2300 in FIG. 23, the user can determine that the third distribution graph 2313 and the sixth distribution graph 2323, which are the distributions of the measured value of the same sensor, are different from each other in shape and average, for example.

Effect of Third Embodiment

It is assumed that the first period 201 as the time range of the time-series past data acquired by the monitoring apparatus 10 is a period obtained by combining the first training period 2201, the second training period 2202, and the intermediate period 2203 as the time ranges of the time-series measured data acquired by the training apparatus 50 with each other, for example. It is assumed the second training period 2202 after the intermediate period 2203, in which maintenance is performed, is short, and the monitoring apparatus 10 started its operation immediately after the intermediate period 2203, for example. Further, it is assumed that the exclusion unit 54 of the training apparatus 50 incorporated all the measured values of the plurality of sensors into the training data without excluding the sensor for which the similarity degree is low.

In such a case, the amount of the training data in the second training period 2202 is smaller than an amount required to train the prediction model. Thus, in such a case, the prediction model has bad prediction accuracy. Consequently, the monitoring apparatus 10 detects the deviation between the measured value and the predicted value many times. Consequently, the user must examine the cause of the deviation between the measured value and the predicted value many times.

On the other hand, the training apparatus 50 according to the present embodiment generates the training data with the measured value corresponding to the sensor for which the similarity degree is low excluded in the exclusion unit 54. In this case, the measured value of the sensor that shifted between the first training period 2201 and the second training period 2202 is excluded from the training data. Consequently, in this case, the prediction accuracy of the prediction model is high, and the monitoring apparatus 10 detects the deviation between the measured value and the predicted value a smaller number of times. Consequently, the user examines the cause of the deviation between the measured value and the predicted value a smaller number of times.

Thus, the monitoring system 40 according to the present embodiment can reduce the number of times of the examination of the cause of the deviation between the measured value and the predicted value by the user. Thus, the monitoring system 40 can improve usability.

Hardware Configuration

Figure 24:
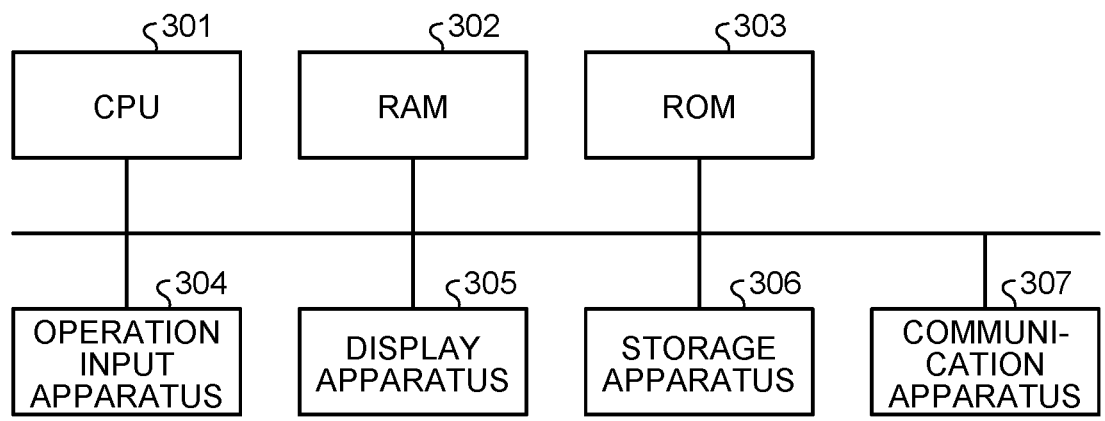
FIG. 24 is a hardware configuration diagram of the monitoring apparatus and the training apparatus.

FIG. 24 is a diagram of an exemplary hardware configuration of the monitoring apparatus 10 and the training apparatus 50 according to the embodiments. The monitoring apparatus 10 is implemented by an information processing apparatus with the hardware configuration illustrated in FIG. 24, for example. The training apparatus 50 is also implemented by a similar hardware configuration. The information processing apparatus includes a central processing unit (CPU) 301, a random access memory (RAM) 302, a read only memory (ROM) 303, an operation input apparatus 304, a display apparatus 305, a storage apparatus 306, and a communication apparatus 307. These units are connected with each other via a bus.

The CPU 301 is a processor executing arithmetic processing, control processing, and the like in accordance with a computer program. The CPU 301 executes various kinds of processing in cooperation with the computer program stored in the ROM 303, the storage apparatus 306, or the like with a prescribed area of the RAM 302 as a working area.

The RAM 302 is a memory such as a synchronous dynamic random access memory (SDRAM). The RAM 302 functions as the working area of the CPU 301. The ROM 303 is a memory storing therein the computer program and various kinds of information in a non-rewritable manner.

The operation input apparatus 304 is an input device such as a mouse or a keyboard. The operation input apparatus 304 receives information operation-input from the user as an instruction signal and outputs the instruction signal to the CPU 301.

The display apparatus 305 is a display device such as a liquid crystal display (LCD). The display apparatus 305 displays various kinds of information based on a display signal from the CPU 301.

The storage apparatus 306 is an apparatus writing and reading data into and from a semiconductor storage medium such as a flash memory or a magnetically or optically recordable storage medium. The storage apparatus 306 writes and reads the data into and from the storage medium in accordance with control from the CPU 301. The communication apparatus 307 communicates with an external device via a network in accordance with control from the CPU 301.

A computer program for causing the information processing apparatus to function as the monitoring apparatus 10 has a modular configuration including a measured data acquisition module, a model acquisition module, a past data acquisition module, a predicted data generation module, an image generation module, a display control module, a correlation acquisition module, a detection module, a similarity degree calculation module, a related sensor identification module, and a score calculation module. This computer program is developed onto the RAM 302 and executed by the CPU 301 (a processor) to cause the information processing apparatus to function as the measured data acquisition unit 11, the model acquisition unit 12, the past data acquisition unit 13, the predicted data generation unit 14, the image generation unit 15, the display control unit 16, the correlation acquisition unit 21, the detection unit 22, the similarity degree calculation unit 23, the related sensor identification unit 24, and the score calculation unit 25. Part or the whole of these may be implemented by a hardware circuit.

A computer program for causing the information processing apparatus to function as the training apparatus 50 has a modular configuration including an acquisition module, a separation module, a calculation module, an exclusion module, a model training module, a second image generation module, a second display control module, and an instruction input module. This computer program is developed onto the RAM 302 and executed by the CPU 301 (a processor) to cause the information processing apparatus to function as the acquisition unit 51, the separation unit 52, the calculation unit 53, the exclusion unit 54, the model training unit 55, the second image generation unit 56, the second display control unit 57, and the instruction input unit 58. Part or the whole of these may be implemented by a hardware circuit.

The computer programs to be executed by the information processing apparatus are recorded and provided on a computer-readable recording medium such as a compact disc read only memory (CD-ROM), a flexible disk (FD), a compact disc recordable (CD-R), and a digital versatile disc (DVD) as a computer-installable or executable file.

The computer programs to be executed by the information processing apparatus may be stored in a computer connected to a network such as the Internet and provided by being downloaded via the network. The computer programs to be executed by the information processing apparatus may be provided or distributed via a network such as the Internet. The computer programs to be executed by the information processing apparatus may be embedded and provided in the ROM 303, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring apparatus comprising:
   a hardware processor configured to:
   acquire time-series measured data including one or more measured values output from one or more sensors installed in a system to be monitored;
   acquire a prediction model that generates predicted data including one or more predicted values predicted to be output from the one or more sensors at a first time based on the measured data at or before first time;
   acquire, as a past data, data including past information on a distribution representing a distribution of a measured value in a first period, with respect to time-series data including one or more measured values output from the one or more sensors before the time-series measured data in a time direction, the first period being a period of training data used to train the prediction model;
   generate time-series predicted data based on the time-series measured data and the prediction model;
   generate, for a first sensor among the one or more sensors, a displayed image including a measured value graph representing a temporal change in a measured value included in the time-series measured data in a second period that is a period after the first period, a predicted value graph representing a temporal change in a predicted value included in the time-series predicted data in the second period, the past distribution in the first period and a measurement distribution representing a distribution of the measured value included in the time-series measured data in the second period; and
   cause a monitoring device to display the displayed image.

2. The apparatus according to claim 1, wherein the hardware processor is further configured to calculate, for each of the one or more sensors, a similarity degree between a distribution of a measured value included in the past data in the first period and a distribution of a measured value included in the measured data in the second period, wherein
   the hardware processor is configured to generate the displayed image including the similarity degree for each of the one or more sensors.

3. The apparatus according to claim 2, wherein the hardware processor is further configured to:
   calculate, for each of the one or more sensors, a difference between measured value included in the measured data at the first time and a predicted value included in the predicted data at the first time and detect, as a target sensor, a sensor for which the difference is larger than a preset first threshold or smaller than a present second threshold among the one or more sensors; and
   calculate a first score having a larger value as the similarity degree is higher for the target sensor, and
   generate the displayed image including at least either the similarity degree or the first score for the target sensor.

4. The apparatus according to claim 3, wherein the system includes a plurality of sensors installed therein, and
   the hardware processor is further configured to:
   acquire correlation information representing an intensity of a correlation for each pair of two sensors included in the plurality of sensors installed in the system; and
   identify, for the target sensor, a related sensor for which the intensity of the correlation with the target sensor is equal to or more than a prescribed value among the plurality of sensors from the correlation information, and
   calculate, for the target sensor, a second score having a value larger as the similarity degree for the target sensor is higher and larger as the similarity degree for the related sensor is higher,
   generate the displayed image including at least either the second score for the target sensor or the similarity degree for the related sensor with respect to the target sensor.

5. The apparatus according to claim 4, wherein the hardware processor is configured to generate the displayed image including at least one of information indicating whether related maintenance is performed, a time at which the maintenance is performed, and contents of the maintenance, for at least one of a sensor for which the similarity degree is lower than a prescribed value, a sensor for which the similarity degree for the related sensor is lower than a prescribed value, a sensor for which the first score is smaller than a prescribed value, a sensor for which the second score is smaller than a prescribed value, and the related sensor to a sensor for which the first score or the second score is smaller than a prescribed value among the plurality of sensors.

6. The apparatus according to claim 2, wherein the hardware processor is further configured to:
   calculate, as a shift amount, a total number of sensors for each of which the similarity degree is lower than a preset third threshold among the one or more sensors or a total of difference degrees for the one or more sensors, the difference degrees each having a smaller value as the similarity degree is higher, and generate the displayed image including the shift amount.

7. The apparatus according to claim 6, wherein the hardware processor is further configured to:
  detect that the shift amount is larger than a preset fourth threshold, and
  generate the displayed image including information indicating that the shift amount is larger than the fourth threshold when the shift amount is larger than the fourth threshold.

8. The apparatus according to claim 4, wherein the hardware processor is further configured to perform control to make the first threshold larger and make the second threshold smaller as any one of the similarity degree, the first score, and the second score is smaller.

9. The apparatus according to claim 4, wherein the hardware processor is further configured to classify each of the one or more sensors into at least four states based on the similarity degree and the similarity degree for the related sensor.

10. The apparatus according to claim 9, wherein the hardware processor is configured to:
  generate a layout image representing a layout of each of the plurality of sensors in the system, and
  changes at least one of information and a color representing each sensor of the plurality of sensors displayed on the layout image in accordance with a state into which the sensor is classified.

11. The apparatus according to claim 9, wherein the hardware processor is configured to display a target sensor list including identification information identifying the target sensor among the plurality of sensors and change a color of each piece of identification information included in the target sensor list in accordance with a state into which the corresponding target sensor is classified.

12. The apparatus according to claim 1, wherein the hardware processor is configured to:
  acquire, as the past data, data including time-series data including one or more measured values output from the one or more sensors before the timeseries measured data in the time direction; and
  generate the display image further including a past value graph representing a temporal change in a measured value included in the time-series past data in the first period, for the first sensor.

13. The apparatus according to claim 1, wherein the hardware processor is configured to:
  acquire, as the past data, data including a maximum value and a minimum value in time-series data including one or more measured values output from the one or more sensors before the time-series measured data in the time direction; and
  generate the displayed image further including a maximum value straight line representing the maximum value or a value obtained by adding a prescribed value to the maximum value and a minimum value straight line representing the minimum value or a value obtained by subtracting a prescribed value from the minimum value, the maximum value straight line and the minimum value straight line being displayed so as to be superimposed on the measured value graph.

14. The apparatus according to claim 1, wherein the hardware processor is further configured to change at least one of a starting time of the first period, an ending time of the first period, a staring time of the second period, and an ending time of the second period in accordance with an instruction by a user.

15. The apparatus according to claim 1, wherein the system comprises a plurality of sensors installed therein, and the hardware processor is further configured to:
  acquire the time-series measured data including a plurality of measured values output from the plurality of sensors;
  separate the time-series measured data into first measured data in a first training period and second measured data in a second training period temporally after the first training period;
  calculate, for each of the plurality of sensors, a similarity degree between a distribution of a corresponding measured value included in the first measured data and a distribution of a corresponding measured value included in the second measured data;
  exclude a measured value corresponding to at least one sensor for which the similarity degree is lower than a preset value among the plurality of measured values included in the time-series measured data, to generate training data; and
  refer to the training data to train the prediction model.

16. A monitoring method for monitoring a system by an information processing apparatus, comprising:
  by the information processing apparatus:
    acquiring time-series measured data including one or more measured values output from one or more sensors installed in the system to be monitored;
    acquiring a prediction model that generates predicted data including one or more predicted values predicted to be output from the one or more sensors at first time based on the measured data at or before first time;
    acquiring, as a past data, data including information on a past distribution representing a distribution of a measured value in a first period, with respect to time-series data including one or more measured values output from the one or more sensors before the time-series measured data in a time direction, the first period being a period of training data used to train the prediction model;
    generating time-series predicted data based on the time-series measured data and the prediction model; and
    generating, for a first sensor among the one or more sensors, a displayed image including a measured value graph representing a temporal change in the measured value included in the time-series measured data in a second period that is a period after the first period, a predicted value graph representing a temporal change in the predicted value included in the time-series predicted data in the second period, the past distribution in the first period and measurement distribution representing a distribution of the measured value included in the time-series measured data in the second period; and
    causing a monitoring device to display the displayed image.

17. A computer program product comprising a computer-readable medium including programmed instructions, the instructions causing a computer of an information processing apparatus to function as:
  a measured data acquisition unit configured to acquire time-series measured data including one or more measured values output from one or more sensors installed in a system to be monitored;
  a model acquisition unit configured to acquire a prediction model that generates predicted data including one or more predicted values predicted to be output from the one or more sensors at a first time based on the measured data at or before first time;

a past data acquisition unit configured to acquire, as a past data, data including information on a past distribution representing a distribution of a measured value in a first period, with respect to time-series data including one or more measured values output from the one or more sensors before the time-series measured data in a time direction, the first period being a period of training data used to train the prediction model;

a predicted data generation unit configured to generate time-series predicted data based on the time-series measured data and the prediction model;

an image generation unit configured to generate, for a first sensor among the one or more sensors, a displayed image including a measured value graph representing a temporal change in the measured value included in the time-series measured data in a second period that is a period after the first period, a predicted value graph representing a temporal change in the predicted value included in the time-series predicted data in the second period, the past distribution in the first period and a measurement distribution representing a distribution of the measured value included in the time-series measured data in the second period; and a monitoring device activation unit configured to cause a monitoring device to display the displayed image.

18. A model training apparatus training a prediction model for use in a monitoring apparatus configured to monitor a system, the model training apparatus comprising:

a hardware processor configured to:

acquire time-series measured data including a plurality of measured values output from a plurality of sensors installed in the system;

separate the time-series measured data into first measured data in a first training period and second measured data in a second training period that is a period after the first training period;

calculate, for each of the plurality of sensors, a similarity degree between a distribution of a corresponding measured value included in the first measured data and a distribution of a corresponding measured value included in the second measured data;

exclude a measured value corresponding to at least one sensor for which the similarity degree is lower than a preset value among the plurality of measured values included in the time-series measured data, to generate training data; and refer to the training data to train the prediction model.

* * * * *

UNITED STATES PATENT AND TRADEMARK OFFICE
CERTIFICATE OF CORRECTION

| | | |
|---|---|---|
| PATENT NO. | : 11,740,613 B2 | |
| APPLICATION NO. | : 17/185882 | |
| DATED | : August 29, 2023 | |
| INVENTOR(S) | : Yasunori Taguchi et al. | |

It is certified that error appears in the above-identified patent and that said Letters Patent is hereby corrected as shown below:

In the Claims

Claim 1, Column 33, Line 43, "at or before first time;" should read --at or before the first time;--.

Claim 3, Column 34, Line 19, "one or more sensors; and" should read --one or more sensors;--.

Claim 4, Column 34, Lines 36-37, "the correlation information, and" should read --the correlation information,--.

Claim 4, Column 34, Line 41, "for the related sensor is higher," should read --for the related sensor is higher, and--.

Claim 12, Column 35, Line 40, "the timeseries" should read --the time-series--.

Claim 14, Column 35, Line 65, "a staring time" should read --a starting time--.

Claim 16, Column 36, Lines 30-32, "at first time based on the measured data at or before first time;" should read --at a first time based on the measured data at or before the first time;--.

Claim 16, Column 36, Lines 42-43, "and the prediction model; and" should read --and the prediction model;--.

Claim 17, Column 37, Line 3, "at or before first time;" should read --at or before the first time;--.

Signed and Sealed this
Twenty-third Day of April, 2024

Katherine Kelly Vidal
*Director of the United States Patent and Trademark Office*